United States Patent
Patane et al.

(10) Patent No.: US 11,280,120 B2
(45) Date of Patent: Mar. 22, 2022

(54) LATCH ASSEMBLY FOR MOTOR VEHICLE CLOSURE SYSTEM HAVING POWER RELEASE MECHANISM WITH MECHANICAL RELEASE AND RESET FEATURE

(71) Applicant: MAGNA CLOSURES INC., Newmarket (CA)

(72) Inventors: Francesco Patane, Newmarket (CA); Enrico Boeri, Camaiore (IT); Carlo Quartieri, Pontedera (IT)

(73) Assignee: MAGNA CLOSURES INC., Newmarket (CA)

(*) Notice: Subject to any disclaimer, the term of this patent is extended or adjusted under 35 U.S.C. 154(b) by 660 days.

(21) Appl. No.: 16/182,790

(22) Filed: Nov. 7, 2018

(65) Prior Publication Data
US 2019/0136590 A1 May 9, 2019

Related U.S. Application Data

(60) Provisional application No. 62/584,021, filed on Nov. 9, 2017.

(51) Int. Cl.
| | |
|---|---|
| *E05B 81/90* | (2014.01) |
| *E05B 81/16* | (2014.01) |
| *E05B 81/34* | (2014.01) |
| *E05B 81/42* | (2014.01) |
| *B60J 5/04* | (2006.01) |
| *B60R 13/02* | (2006.01) |

(52) U.S. Cl.
CPC .............. *E05B 81/90* (2013.01); *E05B 81/16* (2013.01); *E05B 81/34* (2013.01); *B60J 5/0413* (2013.01); *B60J 5/0415* (2013.01); *B60R 13/0243* (2013.01); *E05B 81/42* (2013.01); *E05Y 2900/531* (2013.01)

(58) Field of Classification Search
CPC .......... E05B 81/14; E05B 85/20; E05B 85/24; E05B 85/243; E05B 85/1082; E05B 85/26; E05B 81/90; E05B 81/16; E05B 81/34; E05B 81/42; B60J 5/0413
See application file for complete search history.

(56) References Cited

U.S. PATENT DOCUMENTS

| | | |
|---|---|---|
| 5,387,390 A | 2/1995 | Kornylo |
| 5,397,409 A | 3/1995 | Kornylo |
| 5,571,355 A | 11/1996 | Kornylo |

(Continued)

FOREIGN PATENT DOCUMENTS

| | | |
|---|---|---|
| CN | 1993530 A | 7/2007 |
| CN | 101109248 A | 1/2008 |

(Continued)

*Primary Examiner* — Kristina R Fulton
*Assistant Examiner* — Emily G. Brown
(74) *Attorney, Agent, or Firm* — Dickinson Wright PLLC

(57) ABSTRACT

A power closure latch assembly with a manually actuatable release and reset feature is provided. The release feature allows the latch assembly to be mechanically released from within a cabin of the vehicle such that a vehicle closure panel can be opened, while the reset feature allows the latch assembly to be manually and mechanically reset from within the cabin of the vehicle to allow the vehicle closure panel to be closed and latched.

12 Claims, 14 Drawing Sheets

(56) References Cited

U.S. PATENT DOCUMENTS

| | | | | |
|---|---|---|---|---|
| 5,634,677 | A * | 6/1997 | Buscher | E05B 81/06 |
| | | | | 292/216 |
| 5,885,662 | A | 3/1999 | Gardner, Jr. | |
| 6,007,118 | A * | 12/1999 | Arabia, Jr | E05B 77/265 |
| | | | | 292/216 |
| 6,013,210 | A | 1/2000 | Gardner, Jr. | |
| 6,017,617 | A | 1/2000 | Gardner, Jr. | |
| 6,764,113 | B1 * | 7/2004 | Cetnar | E05B 81/06 |
| | | | | 292/201 |
| 6,863,318 | B2 * | 3/2005 | Mejean | E05B 81/14 |
| | | | | 292/199 |
| 8,522,583 | B2 | 9/2013 | Cumbo et al. | |
| 10,094,147 | B2 | 10/2018 | Lujan et al. | |
| 10,287,806 | B2 * | 5/2019 | Mizuno | E05B 83/18 |
| 11,072,949 | B2 * | 7/2021 | Strole | E05B 81/20 |
| 2002/0096889 | A1 * | 7/2002 | Nelsen | E05B 81/14 |
| | | | | 292/201 |
| 2004/0245786 | A1 * | 12/2004 | Hashiba | E05B 81/66 |
| | | | | 292/216 |
| 2005/0082842 | A1 * | 4/2005 | Warmke | E05B 77/28 |
| | | | | 292/216 |
| 2009/0236863 | A1 * | 9/2009 | Akizuki | E05B 81/14 |
| | | | | 292/201 |
| 2011/0204673 | A1 | 8/2011 | Cumbo et al. | |
| 2014/0175813 | A1 | 6/2014 | Margheritti et al. | |
| 2017/0341526 | A1 | 11/2017 | Marlia et al. | |
| 2018/0355642 | A1 | 12/2018 | Cumbo et al. | |

FOREIGN PATENT DOCUMENTS

| | | |
|---|---|---|
| CN | 102482898 A | 5/2012 |
| CN | 104818909 A | 8/2015 |
| CN | 107407110 A | 11/2017 |
| WO | 2012163503 A1 | 12/2012 |
| WO | WO2014102283 A2 | 7/2014 |

* cited by examiner

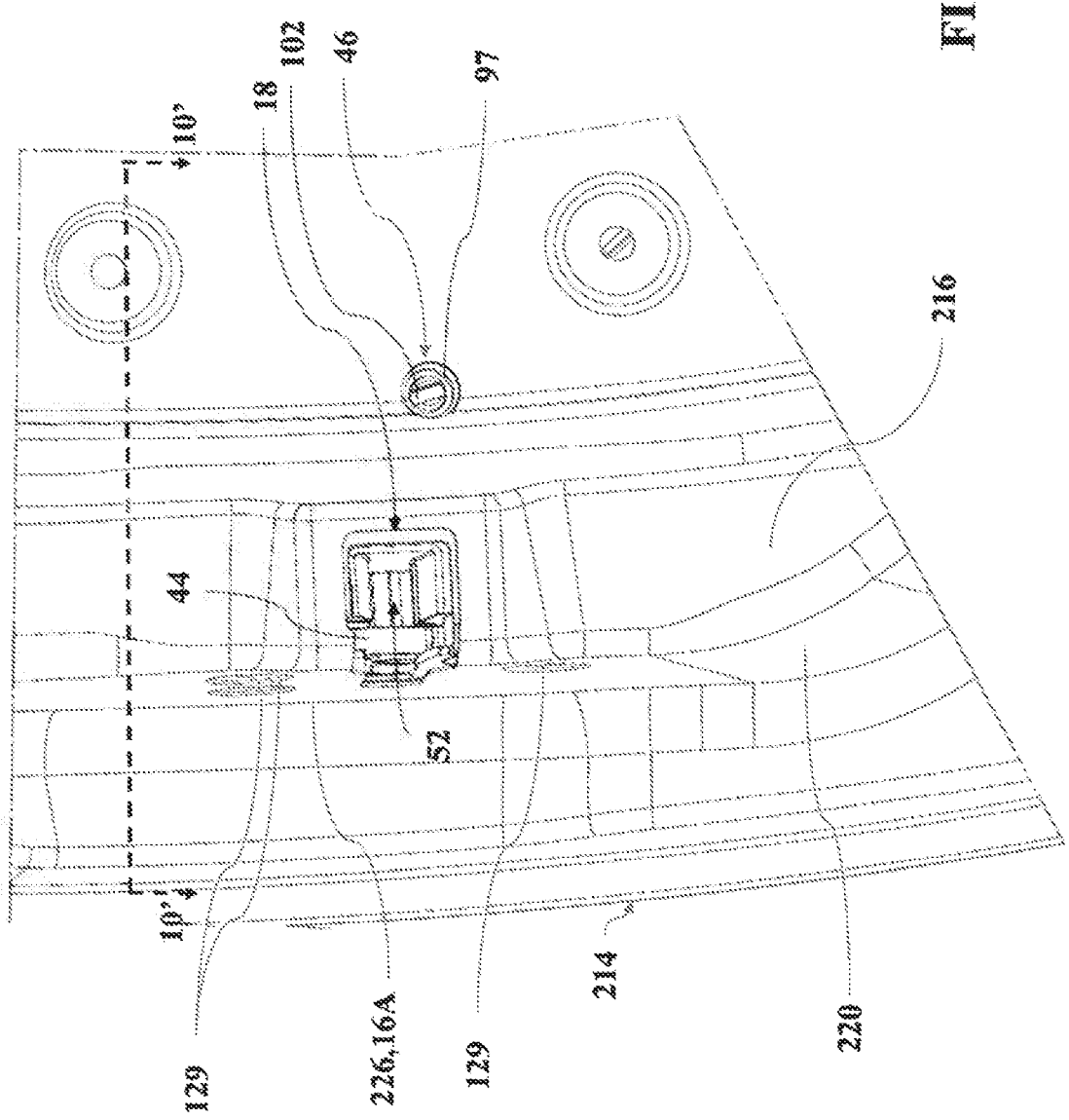

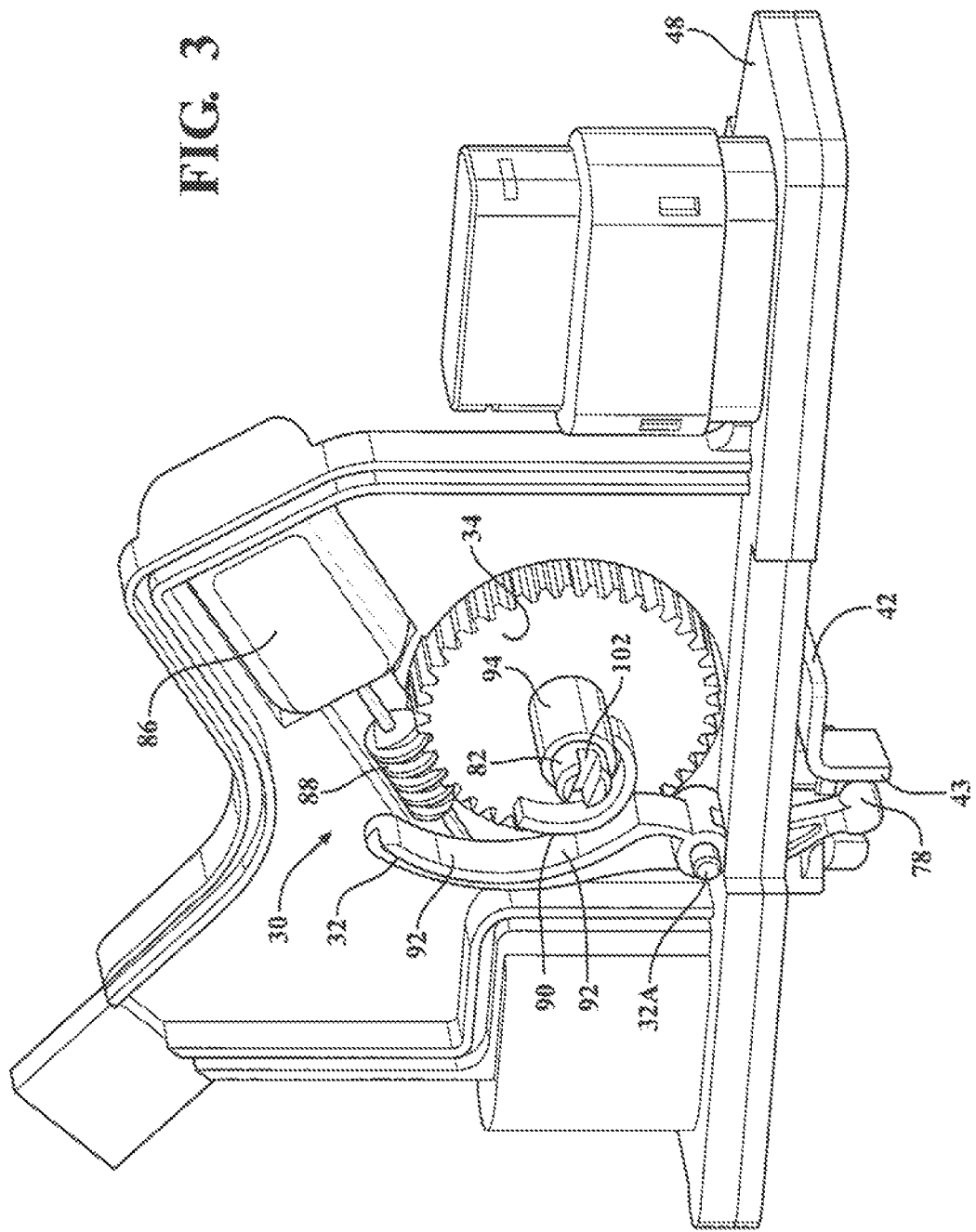

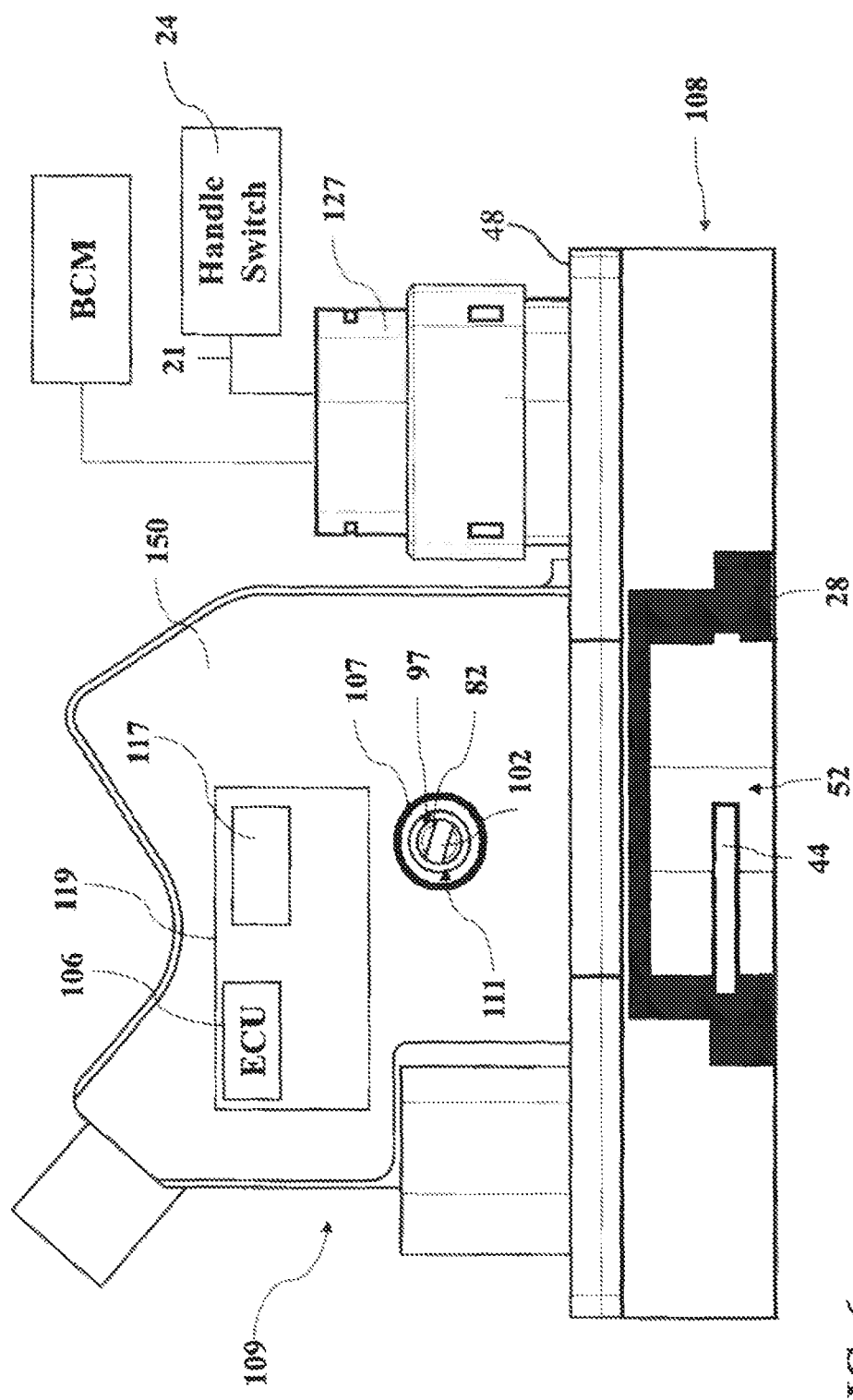

«LATCH ASSEMBLY FOR MOTOR VEHICLE CLOSURE SYSTEM HAVING POWER RELEASE MECHANISM WITH MECHANICAL RELEASE AND RESET FEATURE

CROSS-REFERENCE TO RELATED APPLICATION

This application claims the benefit of U.S. Provisional Application Ser. No. 62/584,021, filed Nov. 9, 2017, which is incorporated herein by reference in its entirety.

FIELD

The present disclosure relates generally to closure latch assemblies of the type used in motor vehicle closure systems for controlling the locking and release of a closure panel. More particularly, the present disclosure relates to a power-operated closure latch assembly providing a power unlatching feature and being equipped with mechanical pawl release and reset mechanism to release and restore ratchet retention functions.

BACKGROUND

This section provides background information related to the present disclosure which is not necessarily prior art.

In view of increased consumer demand for motor vehicles equipped with advanced comfort and convenience features, many modern motor vehicles are now provided with passive entry systems to permit locking and release of closure panels (i.e., doors, tailgates, liftgates and decklids) without use of a traditional key-type entry system. In this regard, some popular features now available with vehicle latch systems include power locking/unlocking, power release and power cinching. These "powered" features are provided by a power closure latch assembly mounted to the closure panel and which is typically equipped with a ratchet and pawl type of latch mechanism controlled via at least one power-operated actuator. Typically, the closure panel is held in a closed position by virtue of the ratchet being held in a striker capture position to releasably retain a striker that is mounted to a structural body portion of the vehicle. The ratchet is held in its striker capture position by the pawl engaging the ratchet when the pawl is located in a ratchet holding position. In many ratchet and pawl type of latch mechanisms, the pawl is operable in its ratchet holding position to retain the ratchet in one of a secondary or "soft close" striker capture position and a primary or "hard close" striker capture position. When the ratchet is held by the pawl in its secondary striker capture position, the latch mechanism functions to latch the closure panel in a partially-closed position relative to the body portion of the vehicle. Likewise, when the ratchet is held by the pawl in its primary striker capture position, the latch mechanism functions to latch the closure panel in a fully-closed position relative to the body portion of the vehicle.

To release the closure panel from its fully-closed position, a power latch release mechanism is powered and actuated for moving the pawl from its ratchet holding position into a ratchet releasing position, whereby a ratchet biasing arrangement, in cooperation with the seal loads exerted on the striker, act to forcibly pivot the ratchet from its primary striker capture position into a striker release position. With the ratchet located in its striker release position, the latch mechanism unlatches the closure panel for subsequent movement toward its open position. In closure latch assemblies providing a power release feature, the latch release mechanism is typically controlled by a power-operated release actuator.

A problem associated with some power-actuated closure latch assemblies providing an ability to release the closure panel from its fully-closed position can arise if power is interrupted (either temporarily interrupted or permanently interrupted) prior to, or upon moving the pawl from its ratchet holding position into the ratchet releasing position. In such instances of power interruption, if prior to opening the closure panel the power-actuated component(s) responsible for driving the pawl against a bias of a spring member to the ratchet releasing position are unable to be actuated, the pawl is prevented from moving to the ratchet release position, thereby preventing the ratchet from moving to the striker release position, and thus, the closure panel is prevented from being able to be opened. On the other hand, if power is interrupted after the pawl is moved to the ratchet release position, thereby allowing the closure panel to be opened, but prior to the pawl being returned to a ratchet holding position in which the ratchet can be maintained in one of the striker capture positions (primary or secondary), the closure panel will be prevented be being able to be closed and retained in the soft and hard close positions. As such, the closure panel is effectively prevented from being able to be opened or from being able to be returned to either a soft close or hard close position as long as power remains interrupted. Accordingly, only upon restoration of power to the latch assembly is the pawl able to be released from or returned to the ratchet holding position, which in turn, prevents the closure panel from being able to be opened or returned to a closed or partially closed position, respectively, as long as power remains interrupted.

Accordingly, while current power closure latch assemblies are sufficient to meet regulatory requirements and provide enhanced comfort and convenience, a need still exists to advance the technology and provide alternative features and arrangements that address and overcome at least some of the shortcomings associated therewith, such as those discussed above. For example, in a power actuatable latch application, in case there is no battery power available and the superconductor (SC) back-up energy is completely depleted, a need exists for a supplemental mechanical back-up release mechanism in order to assure a vehicle occupant is able to release the latch and open the vehicle closure panel. A further need exists when the vehicle panel is opened and the latch is not reset to be able to mechanically reset the latch to allow the vehicle panel to be closed.

SUMMARY

This section provides a general summary of the disclosure and is not intended to be a comprehensive listing of all features, advantages, aspects and objectives associated with the inventive concepts described and illustrated in the detailed description provided herein.

It is an object of the present disclosure to provide a power closure latch assembly for a motor vehicle closure system configured to be manually actuatable, in the absence of power being supplied to the power closure latch, from within a cabin of the motor vehicle.

It is a further object of the present disclosure to provide a power closure latch assembly for a motor vehicle closure system with an ability to have a pawl thereof being able to be mechanically released from a ratchet holding position, from within a cabin of the motor vehicle, to allow a ratchet to be released from a striker capture position to allow a vehicle closure panel to be opened and to allow the pawl to be mechanically reset from the ratchet release position to the ratchet holding position, from within a cabin of the motor vehicle, to allow the ratchet to return from the striker release position to the striker capture position to allow the vehicle closure panel to be returned to at least one of a soft close and hard close position in the event of power failure.

In accordance with these and other objects, it is an aspect of the present disclosure to provide a power closure latch assembly for a motor vehicle closure system configured including a mechanically actuatable release feature that is accessible from with a cabin of the motor vehicle in the event of power failure or interruption.

It is a further aspect of the present disclosure to provide a power closure latch assembly for a motor vehicle closure system configured including a mechanically actuatable reset feature that is accessible from with a cabin of the motor vehicle in the event of power failure.

In accordance with a further aspect of the disclosure, a proposed solution for mechanical release and/or reset does not use a Bowden cable, rod, or other linking mechanism, but provides a feature to allow mechanical action directly on a power release/reset gear mechanism, thereby directly mimicking the action of the power release motor as though it is powered, though mechanically instead of with use of power.

In accordance with a further aspect, a knob backup (backup actuation lever or release member) is placed directly on a J-plane of the vehicle closure panel, thereby being immediately available and accessible to a vehicle occupant from inside a cabin of the vehicle as a purely mechanical release/reset mechanism via movement (rotational or otherwise) of the knob backup, such as in a counterclockwise and/or clockwise direction. Accordingly, in the event of a power failure or interruption, the vehicle occupant is able to readily exit the vehicle.

In accordance with a further aspect, when the vehicle closure panel is open and cannot be closed to a soft and/or hard close position due to loss or interruption of power, such as loss of battery power and SC discharged, the knob back-up can be moved, such as by being rotated in at least one of a counterclockwise and/or clockwise direction, or otherwise moved, thereby mechanically resetting a latch mechanism of the vehicle closure panel and allowing the vehicle closure panel to be closed and latched in at least one of the soft and/or hard close positions.

In accordance with a further aspect, a mechanical release and/or reset mechanism in accordance with the disclosure can be used on any one or more closure panels of the vehicle, thereby providing ready access to such mechanical mechanism by occupants from anywhere inside the vehicle.

In accordance with a further aspect, the knob backup can be configured for receipt of a vehicle key, whereupon rotational movement, or otherwise, of the vehicle key can cause actuation of a mechanical release and/or reset mechanism of the latch mechanism of the vehicle closure panel.

In accordance with a further aspect, a powered closure latch assembly for use with a closure panel in a motor vehicle is provided including a ratchet moveable between a striker release position whereat the ratchet is positioned to release a striker, a striker capture position whereat the ratchet is positioned to retain the striker, and wherein the ratchet is biased toward its striker release position. Further included is a pawl moveable between a ratchet holding position whereat the pawl is positioned to hold the ratchet in its striker capture position and a ratchet releasing position whereat the pawl is located to permit movement of the ratchet to its striker release position, wherein the pawl is biased toward the ratchet holding position. Further yet, a power driven actuator is provided to operably move the ratchet between the striker capture position and the striker release position. In addition, a mechanical release/reset mechanism is provided that is accessible from within a cabin of the vehicle, wherein the mechanical release mechanism is configured to release the pawl from the ratchet holding position from within a cabin of the vehicle to allow the ratchet to move to the striker release position whereat the ratchet releases the striker and allows the vehicle closure panel to be opened.

In accordance with a further aspect, the mechanical release/reset mechanism is configured to return and reset the pawl to the ratchet holding position from within the cabin of the vehicle to allow the ratchet to be returned to the striker capture position whereat the ratchet is positioned to capture the striker and allow the vehicle closure panel to be returned to at least one of a soft and hard close position.

In accordance with a further aspect, the powered closure latch assembly further includes a gear member operatively coupled to the power driven actuator, the gear member having a cam lobe configured for abutment with an actuator lever to pivot the actuator lever and move the pawl between the ratchet holding position and the ratchet releasing position in response to selective actuation of the power driven actuator.

In accordance with a further aspect, the gear member can be configured for rotation in at least one of a first gear member direction and a second gear member direction opposite the first gear member direction, wherein the cam lobe on the gear member can be configured to pivot the actuator lever in the first actuator lever direction, in response to rotation of the gear member in at least one of the first gear member direction and the second gear member direction, to move the pawl from the ratchet holding position to the ratchet releasing position, and to allow the actuator lever to pivot in the second actuator lever direction, in response to rotation of the gear member in at least one of the first gear member direction and the second gear member direction, to move the pawl from the ratchet releasing position to the ratchet holding position.

In accordance with a further aspect, the mechanical release/reset mechanism can be coupled to the gear member, such that mechanically actuated movement of the mechanical release mechanism from within the cabin of the motor vehicle causes the gear member to rotate as though it were powered by the power driven actuator, thereby mimicking powered actuation of the powered closure latch assembly via purely mechanical actuation.

In accordance with a further aspect, the mechanical release/reset mechanism can be fixed directly to the gear member and extending coaxially along a rotational axis of the gear member, such that mechanically actuated movement of the mechanical release/reset mechanism from within the cabin of the motor vehicle causes the gear member to rotate conjointly with the mechanical release/reset mechanism as though it were powered by the power driven actuator, thereby mimicking powered actuation of the powered closure latch assembly via purely mechanical actuation.

In accordance with a further aspect, the actuator lever can be configured to pivot in the first actuator lever direction, in response to rotation of the gear member in the first gear member direction, to move the pawl from the ratchet holding position to the ratchet releasing position, and the actuator lever can be configured to pivot in the second actuator lever direction, in response to rotation of the gear member in the first gear member direction, to move the pawl from the ratchet releasing position to the ratchet holding position.

In accordance with a further aspect, the actuator lever can be configured to pivot in the first actuator lever direction, in response to rotation of the gear member in the first gear member direction, to move the pawl from the ratchet holding position to the ratchet releasing position, and the actuator lever can be configured to pivot in the second actuator lever direction, in response to rotation of the gear member in the second gear member direction, to move the pawl from the ratchet releasing position to the ratchet holding position.

In accordance with another aspect of the disclosure, a method of allowing a power actuatable closure latch assembly to be converted for selective manual actuation during a power interruption to the power actuatable closure latch assembly is provided. The method includes providing a ratchet being moveable between a striker release position and a striker capture position. Further, providing a pawl being moveable between a ratchet holding position to hold the ratchet in the striker capture position and a ratchet releasing position to permit movement of the ratchet to the striker release position. Providing a power driven actuator and an actuator lever configured in operable communication with the power driven actuator and with the pawl, with the actuator lever being pivotable in a first actuator lever direction in response to powered activation of the power driven actuator to cause the pawl to move from the ratchet holding position to the ratchet releasing position, and the actuator lever being pivotable in a second actuator lever direction opposite the first actuator lever direction in response to powered activation of the power driven actuator to cause the pawl to move from the ratchet releasing position to the ratchet holding position. Further, providing a backup actuation lever accessible for mechanical actuation from within a cabin of the motor vehicle, with the backup actuation lever being configured for operable communication with the actuator lever to pivot the actuator lever in at least one of the first actuator lever direction, to allow the pawl to be moved from the ratchet holding position to the ratchet releasing position, and the second actuator lever direction, to allow the pawl to be moved from the ratchet releasing position to the ratchet holding position.

In accordance with another aspect of the disclosure, the method can further include providing a gear member operatively coupled to the power driven actuator for rotation in at least one of first gear member direction and a second gear member direction opposite the first gear member direction, and providing the gear member having a cam lobe configured for abutment with the actuator lever to pivot the actuator lever in the first actuator lever direction, in response to rotation of the gear member in the first gear member direction, to move the pawl from the ratchet holding position to the ratchet releasing position, and to allow the actuator lever to pivot in the second actuator lever direction, in response to rotation of the gear member in at least one of the first gear member direction and the second gear member direction, to move the pawl from the ratchet releasing position to the ratchet holding position.

Further areas of applicability will become apparent from the detailed description provided herein. The description and specific examples in this summary are intended for purposes of illustration only and are not intended to limit the scope of the present disclosure.

DRAWINGS

The drawings described herein are for illustrative purposes only of selected embodiment(s) and not all possible implementations such that the drawings are not intended to limit the scope of the present disclosure.

FIG. 1D is a partial perspective view of the closure panel of FIG. 1 illustrating the mechanical release and reset feature of power closure latch assembly being accessible through the inner sheet panel of the closure panel;

FIG. 3 is a partial perspective view illustrating a power release actuator in a release position;

FIG. 6 is an elevation view of the power release actuator of FIG. 1B, in accordance with an illustrative embodiment;

DETAILED DESCRIPTION

Figure 1:
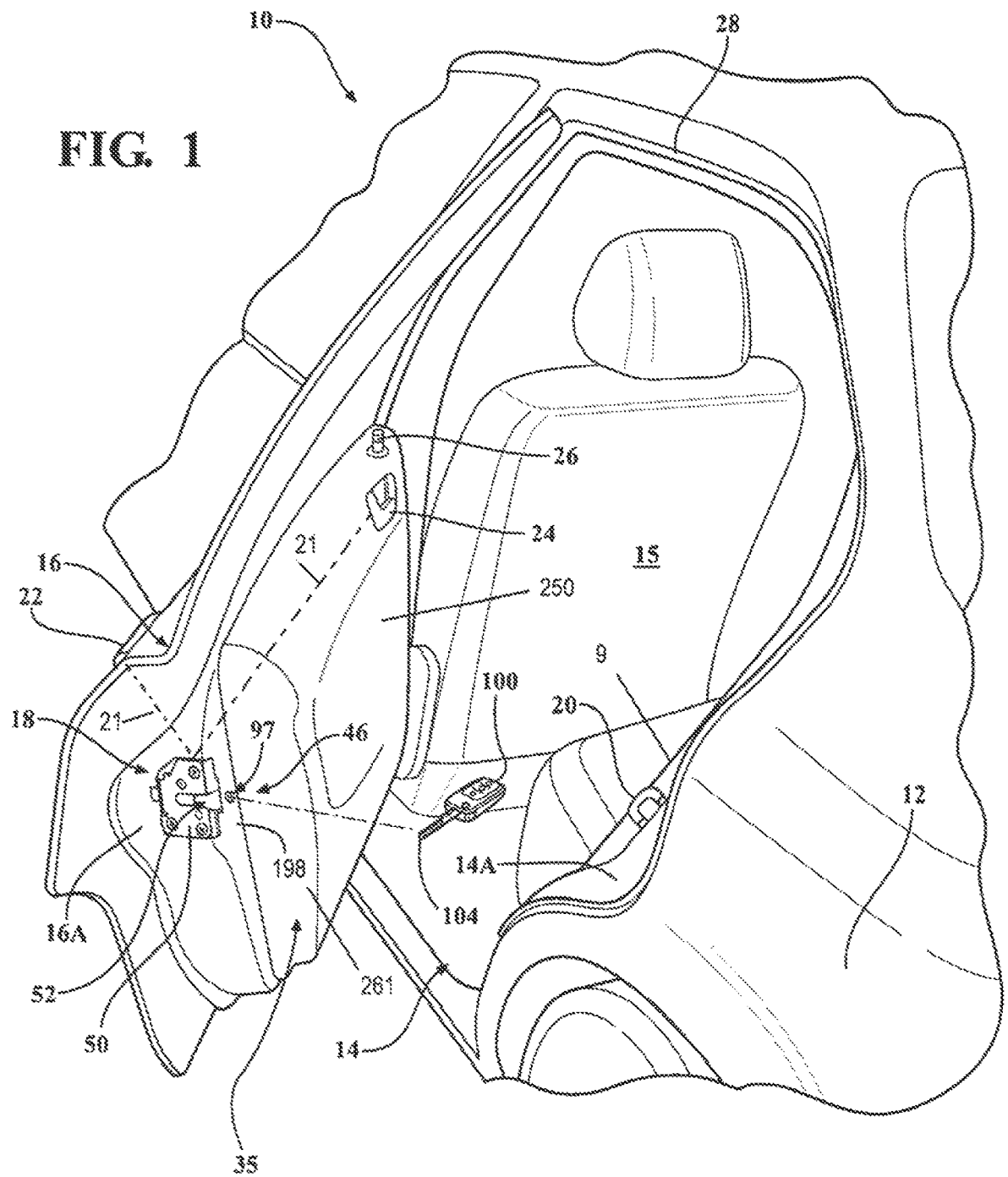
FIG. 1 is a perspective view of a motor vehicle equipped with a power door actuation system situated between a passenger swing door and a vehicle body, with the swing door equipped with a power closure latch assembly having a mechanical release and reset feature constructed in accordance with the teachings of the present disclosure.

An example embodiment of a closure panel and power closure latch assembly therefor for use in a motor vehicle closure system will now be described more fully with reference to the accompanying drawings. To this end, the example embodiment of the power closure latch assembly is provided so that this disclosure will be thorough, and will fully convey its intended scope to those who are skilled in the art. Accordingly, numerous specific details are set forth such as examples of specific components, devices, and methods, to provide a thorough understanding of a particular embodiment of the present disclosure. However, it will be apparent to those skilled in the art that specific details need not be employed, that the example embodiment may be embodied in many different forms, and that the example embodiment should not be construed to limit the scope of the present disclosure. In some parts of the example embodiment, well-known processes, well-known device structures, and well-known technologies are not described in detail.

In the following detailed description, the expression "power closure latch assembly" will be used to generally indicate any power-operated latch device adapted for use with a vehicle closure panel. Additionally, the expression "closure panel" will be used to indicate any element mounted to a vehicle body portion of a motor vehicle and moveable between an open position and at least one closed position, respectively opening and closing an access to an inner compartment of the motor vehicle, and therefore includes, without limitations, decklids, tailgates, liftgates, bonnet lids, and sunroofs in addition to the sliding or pivoting passenger doors of the motor vehicle to which the following description will make explicit reference, purely by way of example.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Figure 1A:
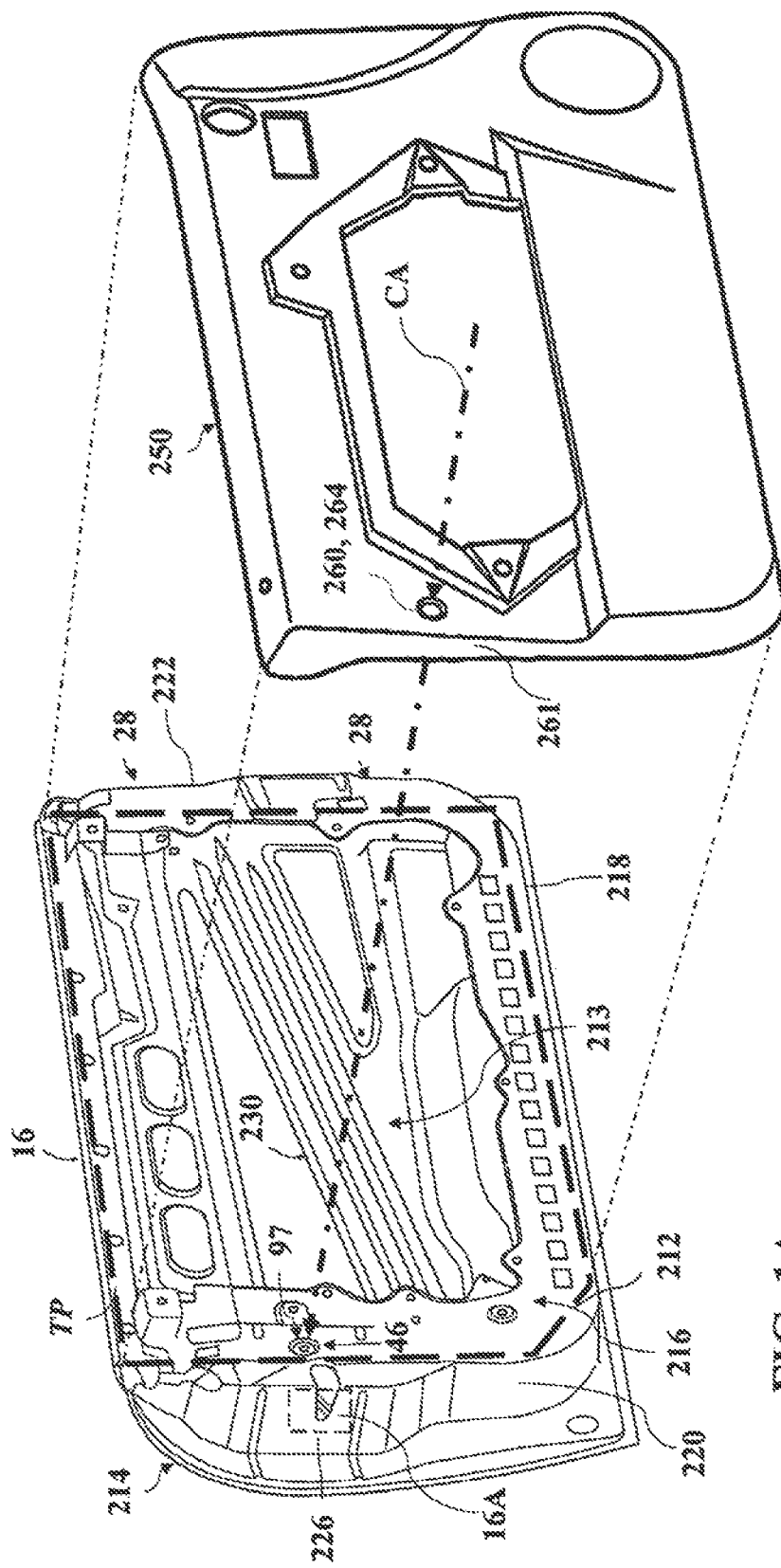
FIG. 1A is an exploded view of the closure panel of FIG. 1.

Referring initially to FIG. 1 of the drawings, a motor vehicle 10 is shown to include a vehicle body 12 defining an opening 14 to an interior passenger compartment, also referred to as cabin 15. A closure panel 16, for example a vehicle door 16, is illustratively shown pivotably mounted to vehicle body 12 for movement between an open position (shown) and a fully-closed position to respectively open and close opening 14. Closure panel 16 illustratively includes a structural door body 212 shown in isolation in FIG. 1A (in an assembled view). The structural door body 212 includes an outer sheet metal layer 214 in the form of a contiguous panel and an inner sheet metal layer 216 that is generally U-shaped. More particularly, the inner sheet metal layer 216 includes a bottom wall 218 and two contiguous opposing end walls 220, 222 forming a cavity 213. End wall 220 features a latch mounting surface 226 for a latch internal the cavity 223, mounted to the opposite external side of the end wall 220 on edge portion 16A. 1A structural door reinforcement panel 230 is disposed between the outer and inner sheet metal layers 214, 216 to provide structural reinforcement therefor. Closure panel 16 illustratively includes a trim panel 250, shown in FIG. 1A as disassembled from structural door body 212, configured to extend over the inner sheet metal layer 216 when assembled to the structural door body 212 to provide an aesthetically pleasing appearance of the closure panel 16 from the passenger cabin 15. The trim panel 250 is generally formed by a molding process, as known in the art per se. See, for example, U.S. Pat. Nos. 5,387,390; 5,397,409; 5,571,355; 5,885,662; 6,013,210; and 6,017,617. Trim panel 250 is secured in part to the sidewall faces of inner sheet metal layer 216 via conventional trim fasteners such as snap fasteners, clips or screws, and generally shown in a manner as projected perimeter TP to cover the inner sheet metal layer 216.

A power closure latch assembly 18 is shown secured to closure panel 16 (see FIG. 1D) adjacent to an edge portion 16A, also referred to as "shut face", thereof and includes a latch mechanism 19 that is releasably engageable with a striker 20 fixedly secured to a recessed edge portion 14A of opening 14. As will be detailed, power closure latch assembly 18 is operable to engage striker 20 and releasably hold closure panel 16 in its fully-closed position. An outside handle 22 and an inside handle 24 may be provided in mechanical connection with power closure latch assembly 18 by bowden cables or formed metal rods to allow for selectively actuating the latch mechanism 19 of power closure latch assembly 18 to release striker 20 from the latch mechanism 19 and permit subsequent movement of closure panel 16 to its open position. An optional lock knob 26 provides a visual indication of the locked state of power closure latch assembly 18 and which may also be operable to mechanically change the locked/unlocked state of power closure latch assembly 18. In an embodiment, the outside handle 22 and/or the inside handle 24 and/or lock knob 26 are in electrical connection via electrical signal wires 21 with the power closure latch assembly 18 (e.g. in electrical communication with an electronic control unit 106 via latch electrical connector 127) for controlling operation of the power closure latch assembly 18. As such, the physical Bowden cables or formed metal rods mentioned above may be eliminated. A weather seal 28 is mounted on edge portion 14A of opening 14 in vehicle body 12 and is adapted to be resiliently compressed upon engagement with a mating sealing surface of closure panel 16 when closure panel 16 is held by the latch mechanism 19 of power closure latch assembly 18 in its fully-closed position so as to provide a sealed interface therebetween which is configured to prevent entry of rain and dirt into the passenger compartment while minimizing audible wind noise. For purpose of clarity and functional association with motor vehicle 10, the closure panel 16 is hereinafter referred to as vehicle door 16.

Figure 1C:
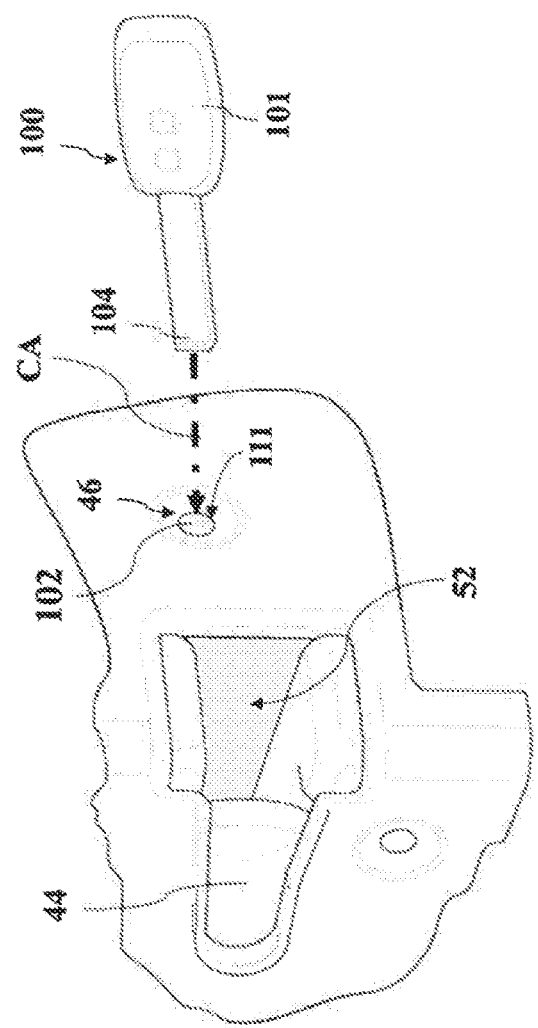
FIG. 1C is a partial perspective view of the power closure latch assembly of FIG. 1, illustrating an engagement of a tool with the mechanical release and reset feature.
Figure 1B:
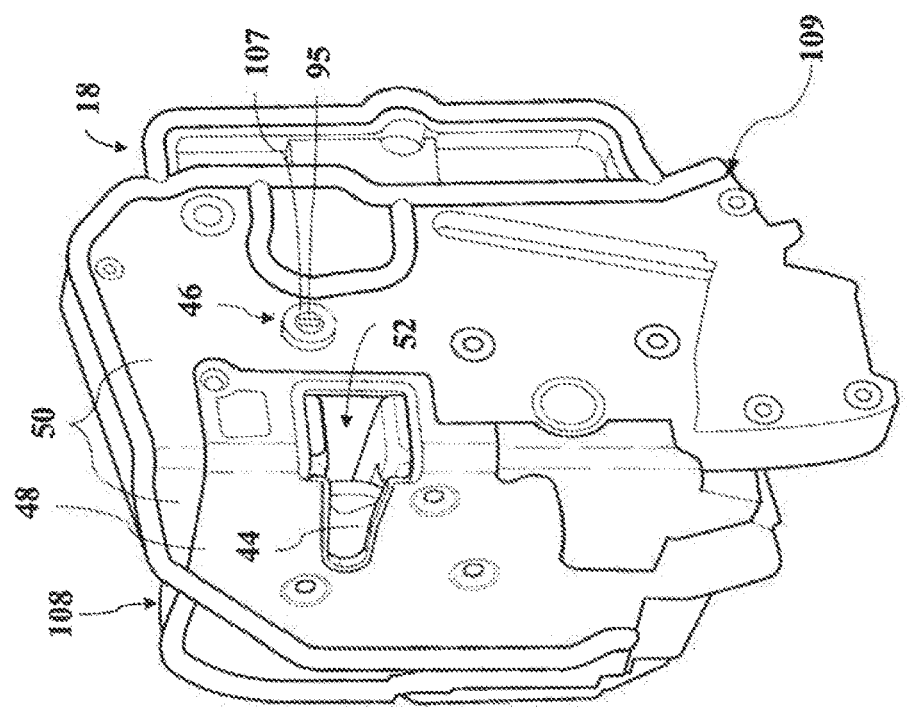
FIG. 1B is a perspective view of the power closure latch assembly of FIG. 1.

A detailed description of a non-limiting example of power closure latch assembly 18, constructed in accordance with the teachings of the present disclosure, will now be provided. In general, power closure latch assembly 18 includes a power driven actuator, also referred to as power release actuator 30, an elongate actuator lever 32, a gear member, referred to hereafter as gear 34, operably communicating and operably coupling the power release actuator 30 to the actuator lever 32, a pawl 40, and a pawl lever, also referred to as release lever 42, operably communicating and operably coupling the actuator lever 32 to the pawl 40. A ratchet 44 is configured for selective locked engagement with the pawl 40 and for selective locked engagement with the striker 20 when the closure panel 16 is in a closed position. A manually actuatable mechanical release and reset feature, also referred to as mechanical release/reset mechanism, override/reset feature or mechanism is shown generally at 46, wherein override/reset feature 46 is accessible to an occupant in the cabin 15, and is operable to manually actuate the latch mechanism 19 to release striker 20 from the latch mechanism 19 and permit a resetting operation to return pawl 40 to a ready position to allow closure panel 16 to be returned to a fully closed, latched position. With reference to FIGS. 1B and 6, it will be readily appreciated by one skilled in the art that the above components can be mounted to and within a housing, sometimes referred to as frame plate 48, suitably shaped for the intended vehicle application, with a housing cover or frame plate cover 50 supporting and enclosing the above-noted mechanisms and power actuators. In an illustrative example, frame plate 48, similar to support assembly 2 as disclosed and described in U.S. Patent Publication No. US 2014/0175813 entitled "Electrical Vehicle Latch", the entire disclosure of which, except for any definitions, disclaimers, disavowals, and inconsistencies, is incorporated herein by reference, includes two support bodies 108, 109. Bodies 108, 109 are arranged transversally, or substantially perpendicular, to one another, so as to define an L-shaped configuration of frame plate 48 when viewed along a plane perpendicular to both the bodies 108, 109 (e.g. see FIG. 9). In particular, body 108 is substantially plate-shaped and carries latch mechanism 19, whilst body 109 is a fluid-tight casing internally housing, in a fluid-tight manner, an electronic control unit 106 and power release actuator 30. Also, body 109 may also illustratively internally house a backup power source 117, such as a supercapacitor group for supplying power to the electronic control unit 106 and the power release actuator 30, for example in the event the main vehicle battery, (e.g. main power source) is not available, in a manner as described in International Patent Application WO 2014/102283 entitled "Backup Energy Source for Automotive Systems and Related Control Method", and U.S. Patent Publication No. US 2017/0341526 entitled "Actuator Assembly for a Motor Vehicle With a Backup Energy Source Having Integrated Boost/buck Converter and Charging System" as examples, the entire disclosures of which, except for any definitions, disclaimers, disavowals, and inconsistencies, are incorporated herein by reference. It is recognized that the backup power source 117 may be provided external whilst body 109, for example in an additional housing mounted to the power closure latch assembly 18 or positioned in the closure panel 16. Plate-shaped body 108 extends parallel to a first plane P1, configured to be secured to, for example using fasteners 109, and flush against the closure panel shut face 16A (e.g. an inner surface 226 of the shut face 16A). Body 109 carries a printed circuit board 119, supporting the electronic control unit 106 and the backup power source 117 in an illustrative example, in a position parallel to a second plane P2, transversal to plane P1; in particular, planes P1 and P2 are substantially orthogonal and, in the example shown, form an angle slightly exceeding 90° (see FIG. 9). Body 109 may also be configured to be secured to the inner panel 216, such that second plane P2 is positioned adjacent the inner panel 216. Body 109 in FIGS. 9 to 14 is illustrated as having the housing wall 150 removed only for purposes of showing the gear 34 and receptacle 102.

Frame plate 48 is a rigid component, shown in the non-limiting embodiment as being configured to be fixedly secured to edge portion 16A of vehicle door 16 and which defines a generally fishmouth-shaped entry aperture 52 through which striker 20 travels upon movement of vehicle door 16 relative to vehicle body 12. Latch mechanism 19 is shown, in this non-limiting example, as a single ratchet and pawl arrangement including the ratchet 44 and pawl 40, though it is contemplated herein that multiple pawl and/or ratchet levers could be incorporated, as will be readily understood by a person possessing ordinary skill in the art of vehicle closure panel latches. For example, latch mechanism 19 may be configured as a double pawl configuration including a primary pawl 25', an auxiliary ratchet 26' and a secondary pawl 27', as described in U.S. Patent Publication No. US 2014/0175813, the entire disclosure of which, except for any definitions, disclaimers, disavowals, and inconsistencies, is incorporated herein by reference, wherein the manually actuatable mechanical release and reset feature 46 described herein is adaptable, in accordance with an illustrative example, for providing a rotation of the first gear wheel 53' (e.g. similar to gear 34) imparted by an external rotation of a user driven tool, such as key 100, being received in a receptacle as described herein of the gear wheel 53', for actuating the secondary pawl 27', with reference numbers referred to being offset by the prime symbol "'" corresponding to the reference elements of U.S. Patent Publication No. US 2014/0175813. Ratchet 44 is supported for rotational movement relative to frame plate 48 via a ratchet pivot pin 54. Ratchet 44 is configured to include a contoured guide channel 56 which terminates in a striker capture pocket 58, a closing notch 60, and a cam surface 62 extending between closing notch 60 and a nose-shaped terminal end segment 64. A ratchet biasing member, schematically shown by arrow 66, is adapted to normally bias ratchet 44 to rotate about ratchet pivot pin 54 in a first, opening or "releasing" direction (i.e. counterclockwise in FIGS. 2A and 2B). As will be detailed, ratchet 44 is moveable through a range of motion between its striker release position and a striker capture (i.e. the "hard closed") position, with intermediate positions (i.e. the "soft closed" position) contemplated herein.

Pawl 40 is supported for rotational movement relative to a pawl pivot pin 68, such as can be provided to extend from frame plate 48. Pawl 40 is configured to include a body segment having a latch shoulder 70 that is adapted to ride against cam surface 62 of ratchet 44 in response to movement of ratchet 44 between its striker capture and striker release positions. Latch shoulder 70 on pawl 40 is also configured to engage closing notch 60 when ratchet 44 is located in its striker capture position. A pawl biasing member, schematically illustrated by arrow 72, is provided for normally biasing pawl 40 in a first rotary direction (i.e. clockwise in FIGS. 2A and 2B) toward its ratchet holding position. A further biasing member includes a release lever biasing member, schematically illustrated by arrow 74, which is provided for normally biasing release lever 42 in a first rotary direction (i.e. clockwise in FIGS. 2A and 2B). As such, release lever biasing member 74 biases release lever 42 into biased engagement with actuator lever 32.

In accordance with a non-limiting aspect, the manually actuatable override/reset feature 46 is shown having a backup release lever, also referred to as backup knob or backup actuation lever 82. The manually actuatable override/reset feature 46 provides an ability to override and reset the power closure latch assembly 18 from with the cabin 15 in the event of power interruption to power release actuator 30, during any operational state of the power closure latch assembly 18. As such, override/reset feature 46 allows the vehicle closure panel 16 to be released from a closed, latched position to an open, unlatched position from within the cabin 15 absent power being supplied to the power release actuator 30, and to be returned from the open, unlatched position to the closed, latched position, as is discussed in more detail hereafter. While reference is made herein to the manually actuatable override/reset feature 46 providing an ability to override and reset the power closure latch assembly 18 in the event of power interruption, other conditions preventing the reset of the power closure latch assembly 18, such as a mechanical failure in the motor 86, may be overcome with the manually actuatable override/reset feature 46.

Figure 2A:
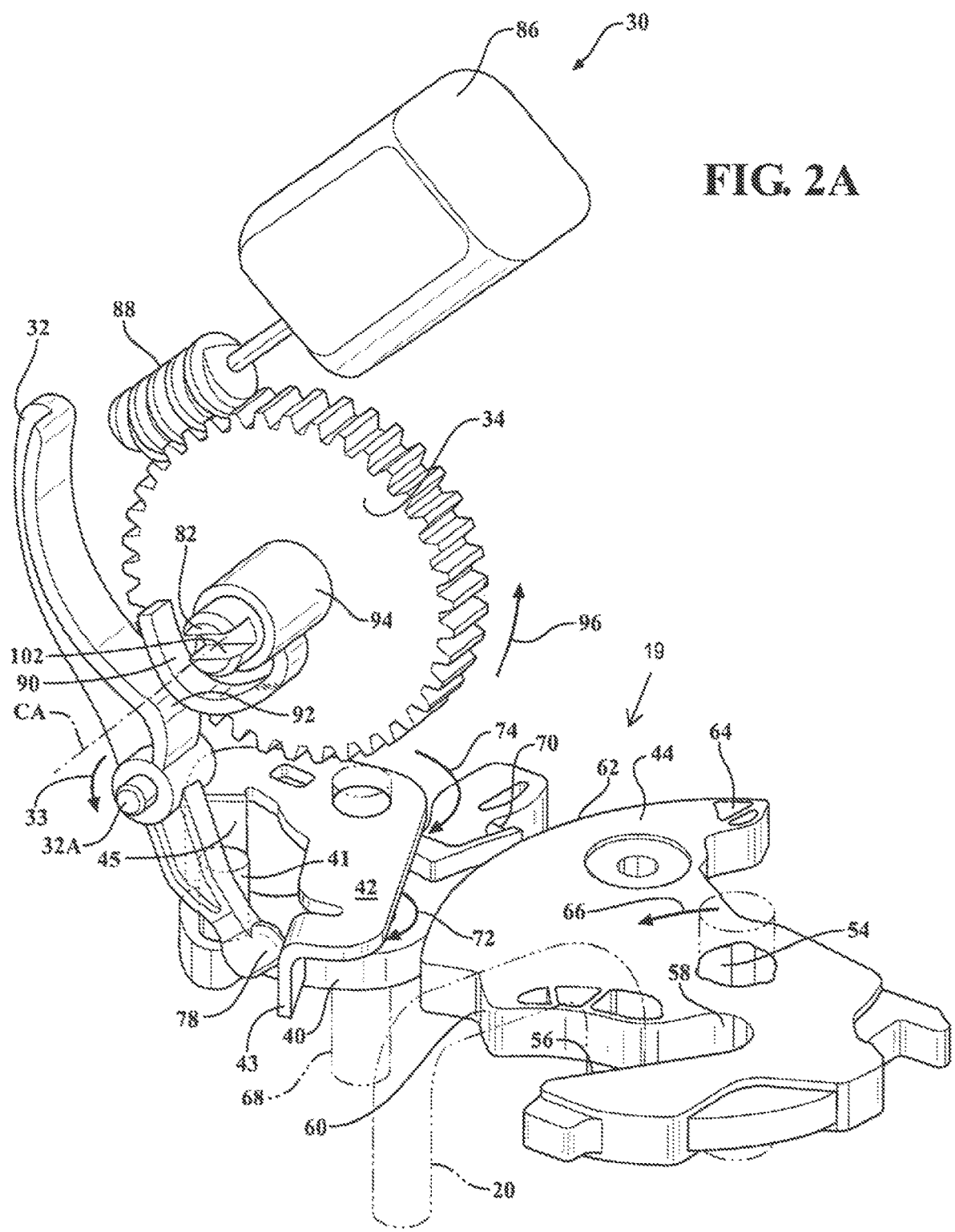
FIG. 2A is an isometric view of the power closure latch assembly in accordance with one aspect of the present disclosure generally illustrating the components thereof while in a latched position.
Figure 2B:
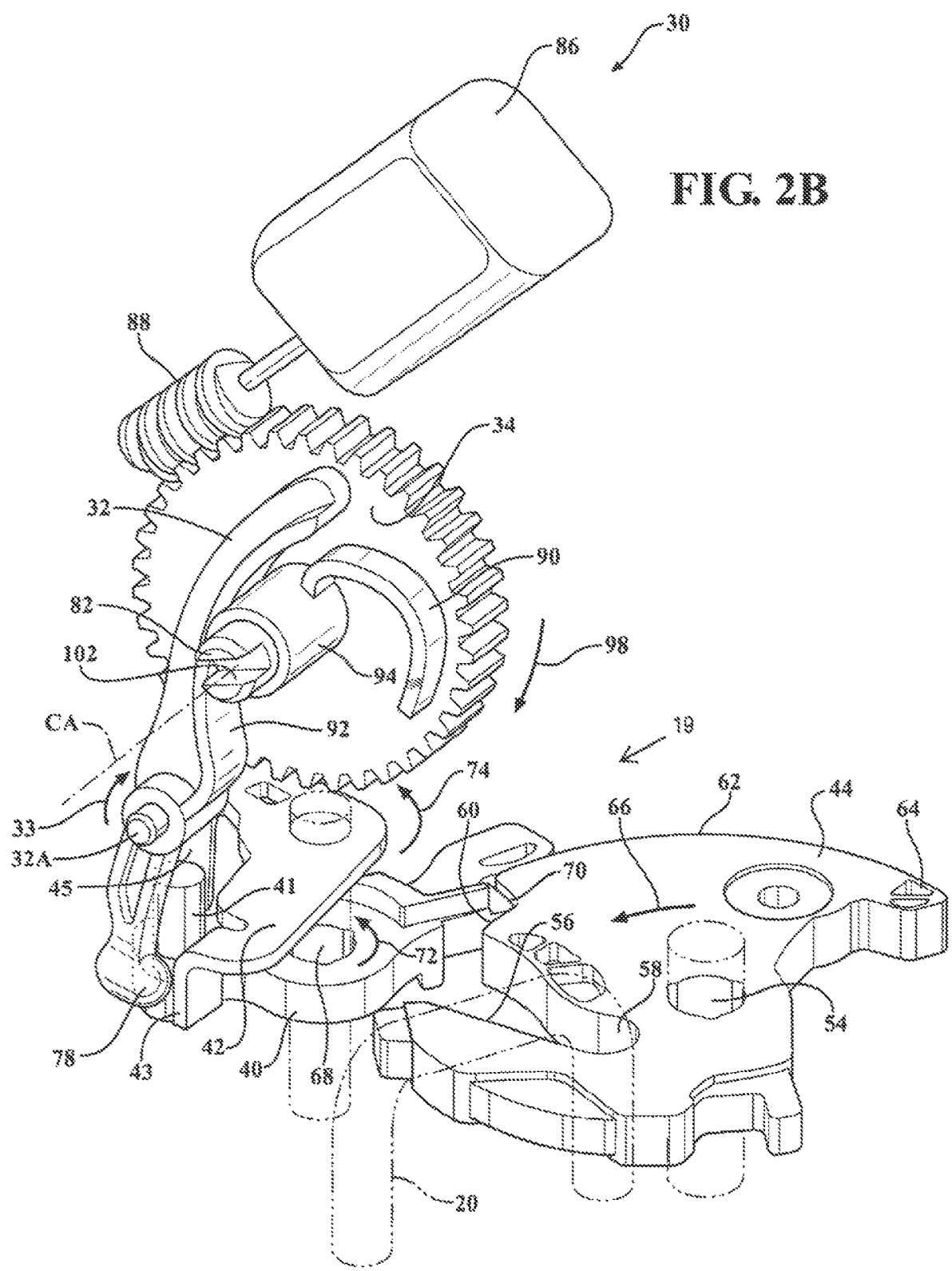
FIG. 2B is a view similar to FIG. 2A generally illustrating the components of the power closure latch assembly while in an unlatched, released position.

The power release actuator 30, by way of example and without limitation, is shown as including a selectively actuatable electric motor 86 having a drive shaft, shown as a drive worm shaft, also referred to as drive gear or worm gear 88, configured for meshed, driving engagement with the gear 34. The gear 34 is support for selective rotation about a central axis CA of a gear shaft 94 in response to actuation of the motor 86, with the gear 34 having a cam lobe 90 extending axially outwardly from a face thereof, with cam lobe 90 being configured for driving engagement with a cam surface 92 on the actuator lever 32. As such, when the electric motor 86 drives the drive worm shaft 88 in a first direction, the drive worm shaft 88 causes the gear 34 and cam lobe 90 fixed thereto to rotate in a first gear member direction, also referred to as first unlocking, release direction 96 (FIG. 2A), and when the electric motor 86 drives the drive worm shaft 88 in a second direction opposite the first direction, the drive worm shaft 88 causes the gear 34 and cam lobe 90 fixed thereto to rotate in a second gear member direction opposite the first gear member direction, also referred to as second locking or latching direction 98 (FIG. 2B). In an embodiment, a spring having a bias shown as similar to direction 98 may cause the gear 34 to rotate in the second gear member direction opposite the first gear member direction, thereby back driving the drive worm shaft 88, without the operation of the actuator 30.

In normal use, under fully functional electrical operation, in direct response to selective actuation of the power release actuator 30, the worm gear 88 is caused to rotate and rotatably drive the gear 34 in the first gear member direction, whereby cam lobe 90 rotates conjointly with gear 34 in biased engagement with the cam surface 92 of actuator lever 32, thereby causing pivotable actuator lever 32 to be pivoted about pin 32A in a first actuator lever releasing direction 33. While a pivoting movement of the actuator lever 32 and other levers are illustrated herein, it is understood other movements of the levers, such as the actuator lever 32 are possible such that the levers are moveable e.g. sliding. As actuator lever 32 pivots in the first actuator lever direction 33, a drive lug 78 of actuator lever 32, located on an opposite side of pin 32A from cam surface 92, forcibly drives an actuation tab 43 of release lever 42 to pivot the release lever 42 against the bias of the release lever biasing member 74 to bring a release tab 45 of release lever 42 into driving engagement with a release lug, shown as an upstanding pin 41, of pawl 40. As release tab 45 drives release lug 41, pawl 40 is caused to pivot from the ratchet holding position (FIG. 2A) to the ratchet releasing position (FIG. 2B) to provide electrically power-assisted movement of the pawl 40 between the ratchet holding position and the releasing position. Upon pawl 40 being rotated against the bias of pawl biasing member 72, latch shoulder 70 is pivoted out from engagement with closing notch 60 of ratchet 44, thereby allowing ratchet 44 to pivot from the striker capture position to the striker release position under the bias of ratchet biasing member 66. Thereafter, in direct response to continued powered actuation of the power release actuator 30, the worm gear 88 continues to rotatably drive the gear 34 in the first gear member direction 98, whereby cam lobe 90 rotates conjointly with gear 34 out from engagement with cam surface 92, whereupon actuator lever 32 is caused to be pivoted in a second actuator lever resetting direction 35 opposite the first actuator lever releasing direction 33 to allow the release tab 45 of release lever 42, under the bias of the release lever biasing member 74, to pivot away from release lug 41 of pawl 40, and thus, the pawl 40 is able to rotate clockwise into engagement with ratchet cam surface 62 for ready position to return to the ratchet holding position upon a door closing event to retain the door 16 in the closed position.

On the other hand, during a power out or power interruption condition, when the electric motor 86 is unable to be powered, or during a mechanical failure to electrical motor 86, selective manual actuation of power closure latch assembly 18 can be performed via the backup actuation lever 82 from within the cabin 15 to both release the pawl 40 from the ratchet holding position, thereby allowing the door 16 to be opened, and also reset the pawl 40 to return the pawl 40 from the ratchet release position into engagement with ratchet cam surface 62 for ready position to return to the ratchet holding position upon a door closing event to retain the door 16 in the closed position.

Figure 2C:
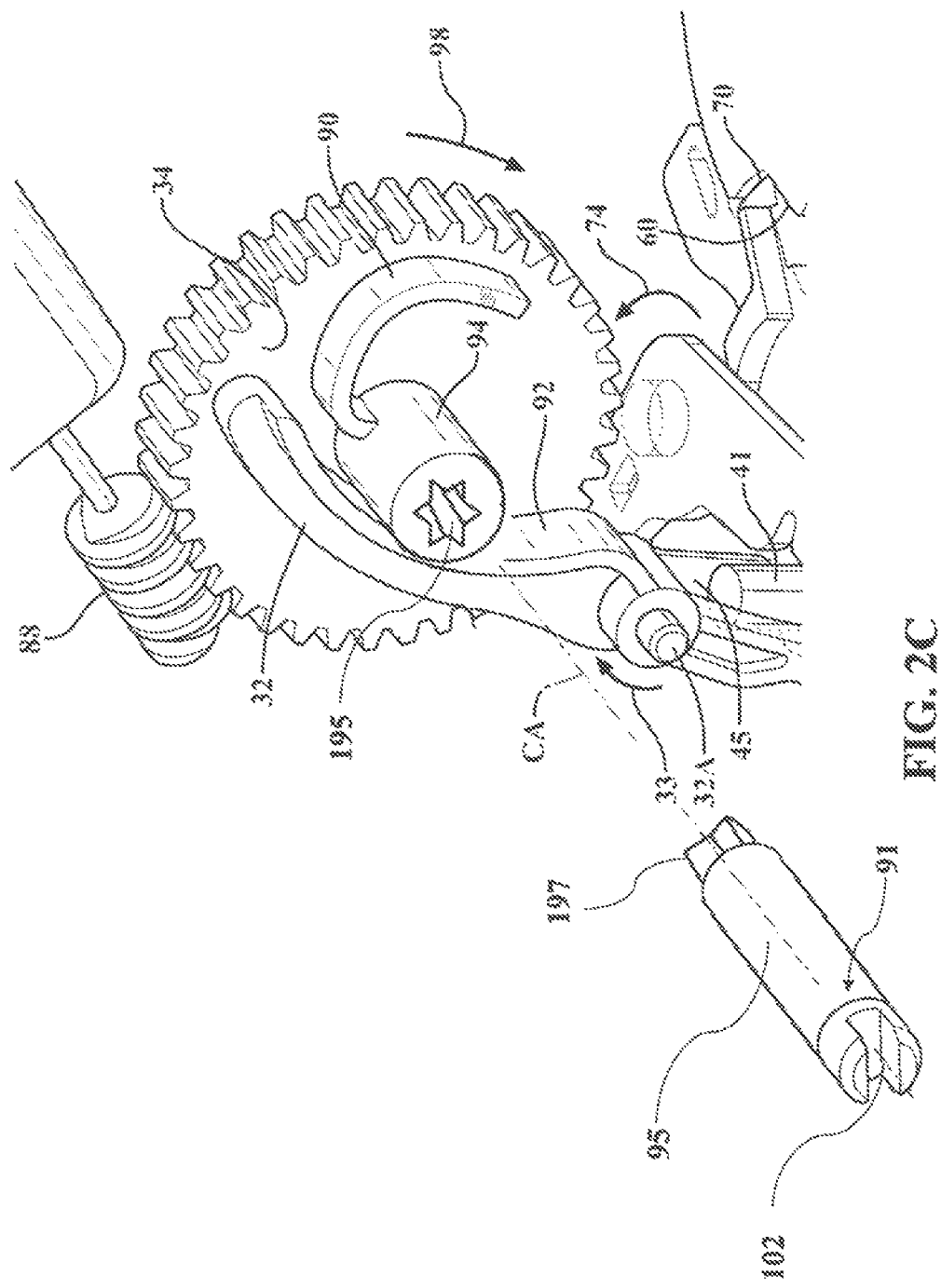
FIG. 2C is an enlarged view of FIG. 2B generally illustrating an extensible configuration of a receptacle, in accordance with an illustrative embodiment.
Figure 4:
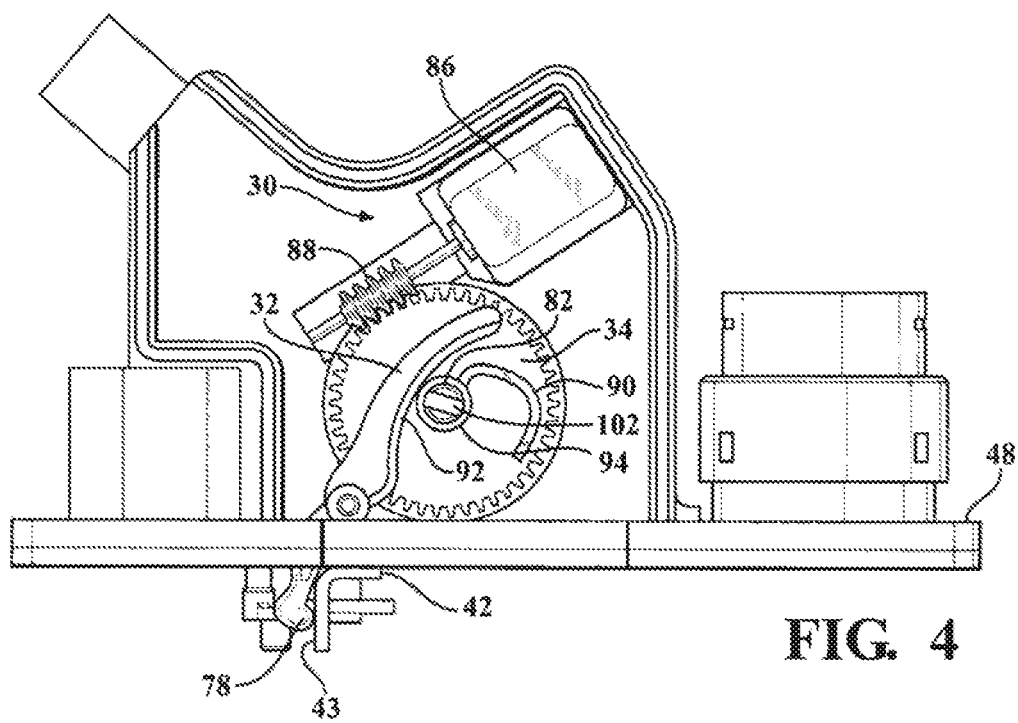
FIG. 4 is elevation view of the power release actuator of FIG. 3 shown in the release position.
Figure 5:
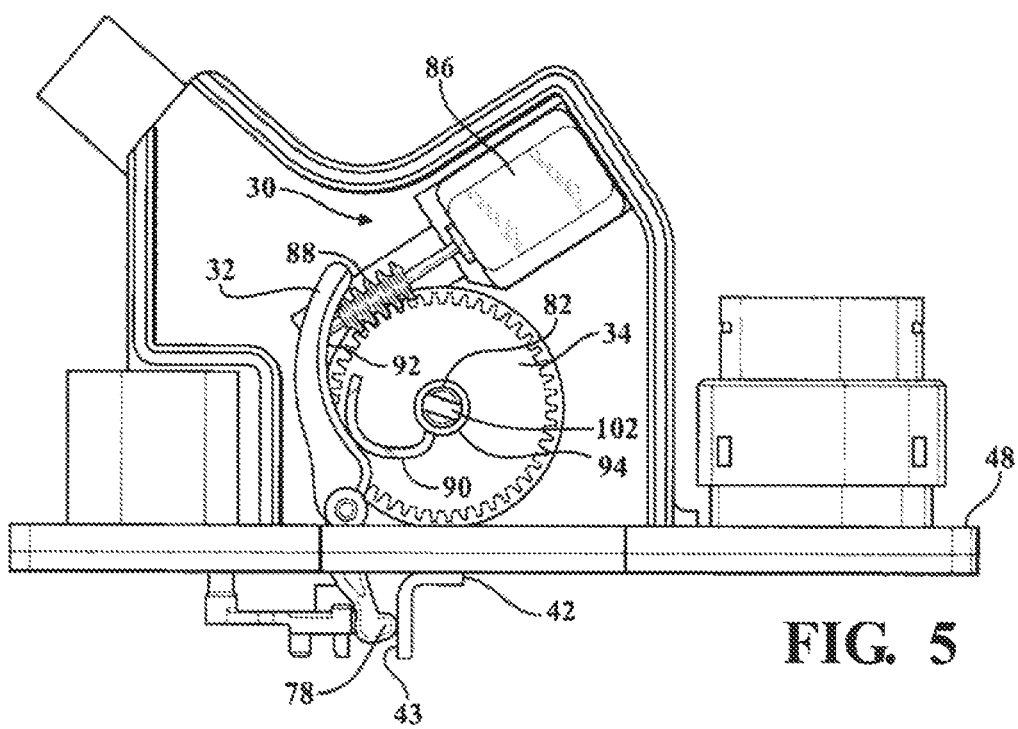
FIG. 5 is a view similar to FIG. 4 with the power release actuator shown in a reset, home position.
Figure 10:
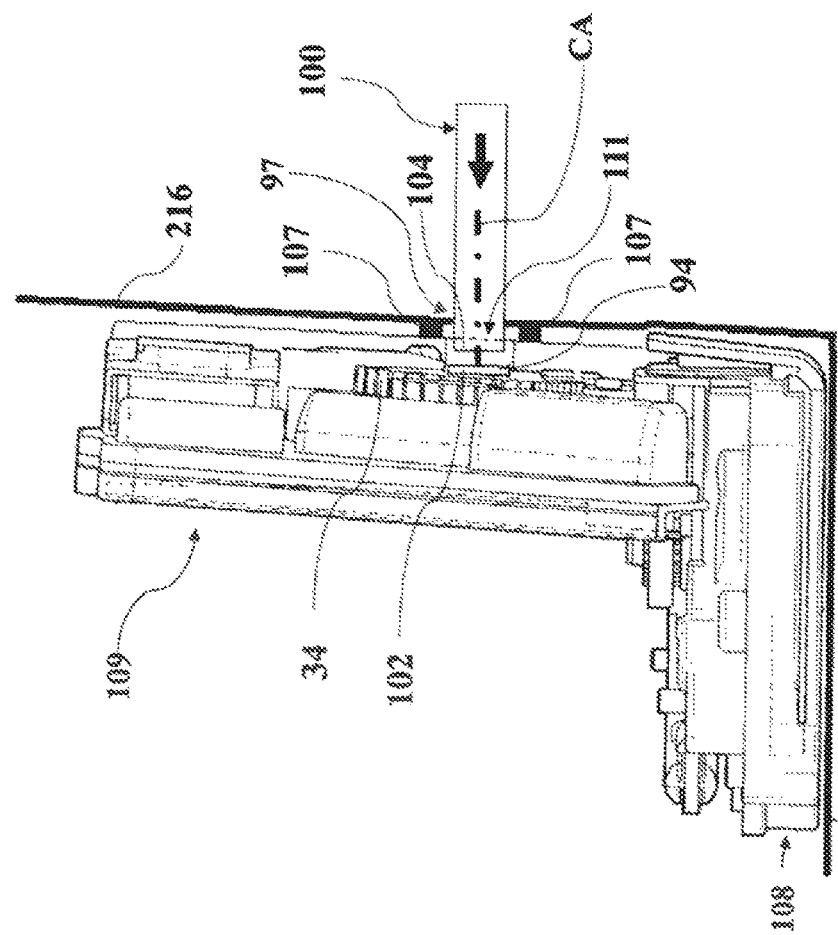
FIG. 10 is top view taken along the line 10'-10' of FIG. 1D.
Figure 9:
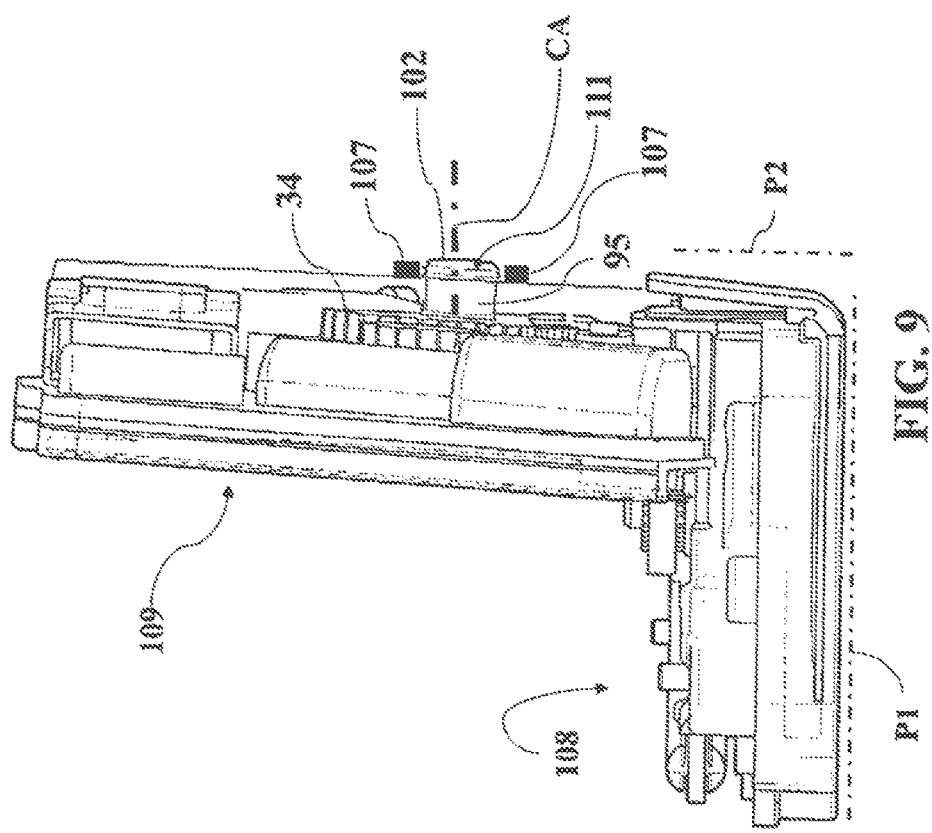
FIG. 9 is top view of power closure latch assembly of FIG. 1B, in accordance with an illustrative embodiment.
Figure 12:
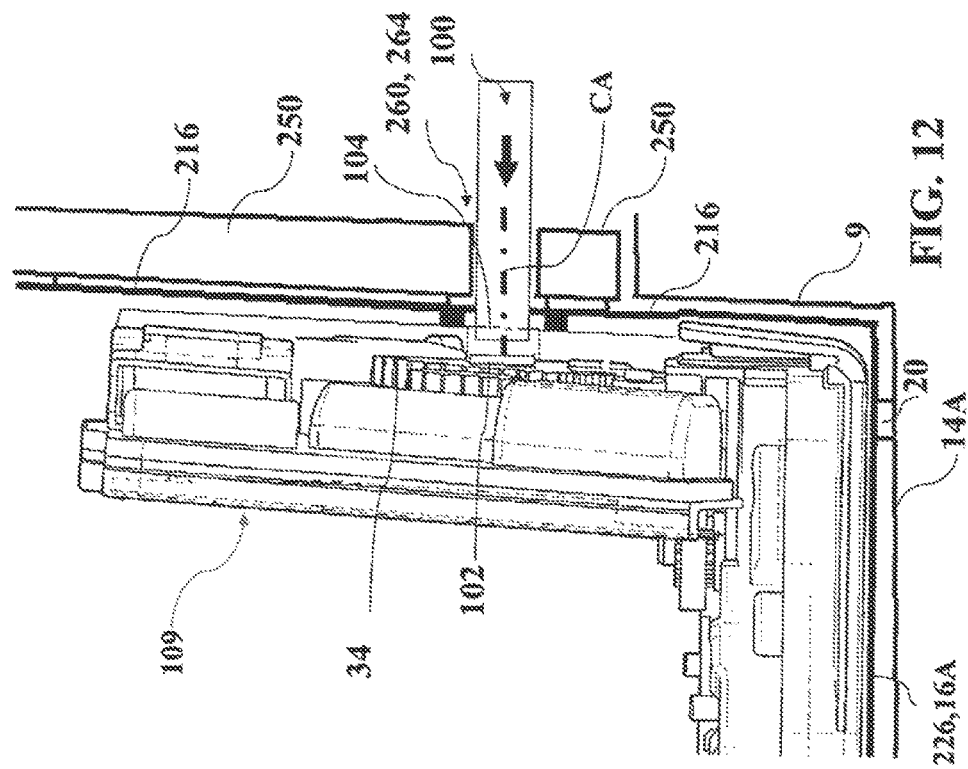
FIG. 12 is top view taken along the line 10'-10' of FIG. 1D, illustrating an access feature of FIG. 8.
Figure 11:
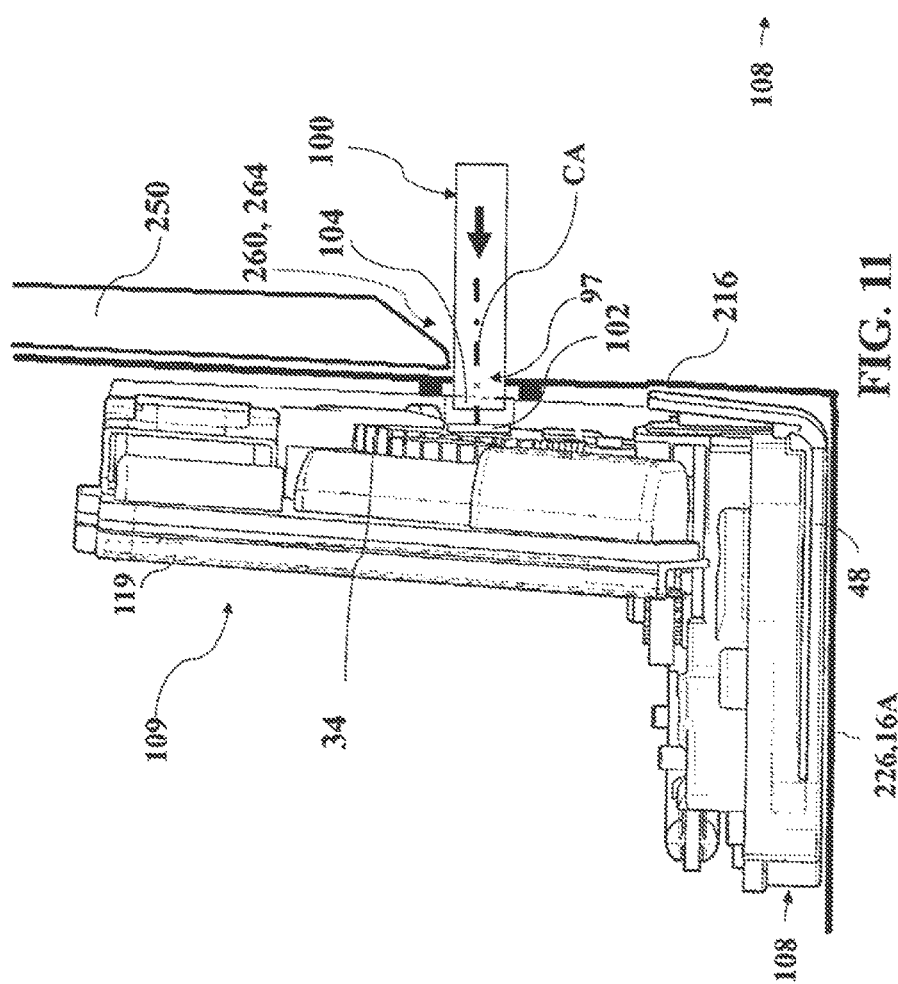
FIG. 11 is top view taken along the line 10'-10' of FIG. 1D, illustrating an access feature of FIG. 7.

Accordingly, in the event the latch shoulder 70 of pawl 40 is unable to return into biased abutment with the cam surface 62 of ratchet 44 (and also latch shoulder 70 on pawl 40 is unable to return into biased abutment and engagement with closing notch 60 when ratchet 44 is located in its striker capture position) during a power interruption or mechanical failure/issue, as discussed above, the override/reset feature 46 can be manually activated from within cabin 15 to overcome the lack of power to the power release actuator 30 or overcome a mechanical issue therewith. In order to actuate the override/reset feature 46, a vehicle key 100, or other appropriately shaped tool, as will be understood by a person possessing ordinary skill in the art upon viewing the disclosure herein, can be inserted through an opening, also referred to as entry aperture 97, provided in an interior panel 216 of door 16, wherein entry aperture 97 is provided to be readily accessible to an occupant in the cabin 15. As such, the key 100 can be inserted into a receptacle 102 (illustratively a corresponding sized slot to receive the tip 104 of the vehicle key 100) of the backup actuation lever 82. Illustratively, receptacle 102 may be integrally formed with shaft 94, or may be a separate extension shaft 95 connected to the shaft 94, as shown in FIG. 2C and FIG. 9. Illustratively, a keyed connection with mating keyed features 195, 197 are provided on shafts 94, 95 for a pressed fit as an example, but other connections are possible. For example, the shafts 94, 95 may be biased away from each other, such as by a spring, during normal operation of the gear 34 to avoid the actuator 30 having to rotate the extension shaft 95 during normal operation, and which may be brought into engagement with one another during a desired manual release by urging the shaft 95 towards the shaft 94 with the key 100 by the user to overcome the bias and allow rotation of the extension shaft 95 to impart a concurrent rotation of the shaft 94. With reference to FIG. 1B, shaft 94 is formed itself as an integrally elongated shaft, or may be provided with an extension shaft 95 attached thereto, and is illustrated to extend through the housing wall 150 (e.g. through port 111) of the body 109 to position the receptacle 102 exterior to the body 109. Seal 107 is illustrated in FIG. 1B as encircling or surrounding extension shaft 95 without unnecessarily impeding with rotation of the shaft 94, 95. With reference to FIG. 1C and FIG. 10, shaft 94 may extend interior the body 109 to position the receptacle 102 interior to the body 109. Varying the effective length of the shaft 94 e.g. via extension shaft 95, or by integrally extending shaft 94 along axis CA, may allow tools, such as key 100 with shorter lengths to engage the receptacle 102, despite any interfering trim panel 250 obstructing the body 101 of the key 100 to prevent engagement of the key tip 104 with the receptacle 102. With the key 100 received in the receptacle 102, the vehicle key 100 can be rotated to rotate the backup actuation lever 82 and cause conjoint rotation of the gear 34 and concurrent rotation of worm gear 88 in similar fashion as though the worm gear 88 and gear 34 were being rotated via powered actuation. Accordingly, the manual actuation and rotation of gear 34 mimics the function of power closure latch assembly 18 as though it were powered. Thus, the pawl 40 is able to be manually moved to the desired location via selective rotation of backup actuation lever 82, in the desired clockwise and/or counterclockwise direction to move the cam lobe 90 as desired via key 100. Accordingly, if the desire is to release the pawl 40 from the ratchet holding position to allow the door 16 to be opened, the key 100 and the override/reset feature 46 can be rotated in a first releasing direction, such as counterclockwise, and if the desire is to reset the pawl 40 to allow the pawl 40 to move into the ratchet holding position upon closing the door 16, the key 100 can be rotated counterclockwise to move the cam lobe 90 of override/reset feature 46 out from contact with the cam surface 92, or the override/reset feature 46 can be rotated in an opposite second resetting direction, such as clockwise via key 100, thereby causing cam lobe 90 to slide back along cam surface 92 to the reset, home position (FIGS. 2A and 4). Accordingly, it is to be recognized that the cam lobe 90 can be rotated in the counterclockwise direction to the release position shown in FIGS. 2B, 3 and 5, and then the cam lobe 90 can be rotated further in the counterclockwise direction to drive the cam lobe 90 out from engagement with the cam surface 92, whereupon the actuator lever 32 returns under the bias of release lever 42 to the reset, home position, as shown in FIGS. 2A and 4. Otherwise, while in the release position shown in FIGS. 2B, 3 and 5, the cam lobe 90 can be rotated in the clockwise direction to essentially reverse the path of cam lobe 90 along cam surface 92 until cam lobe 90 is returned to the reset, home position, as shown in FIGS. 2A and 4.

Then, upon the restoration of power to the power release actuator 30, the power closure latch assembly 18 is able to automatically return to its power mode of operation.

In accordance with another aspect of the disclosure, a method of allowing a power actuatable closure latch assembly 18 to be converted for selective manual actuation during a power interruption to the power actuatable closure latch assembly 18 is provided. The method includes providing a ratchet 44 being moveable between a striker release position and a striker capture position. Further, providing a pawl 40 being moveable between a ratchet holding position to hold the ratchet 44 in the striker capture position and a ratchet releasing position to permit movement of the ratchet 44 to the striker release position. Providing a power driven actuator 30 and an actuator lever 32 configured in operable communication with the power driven actuator 30 and with the pawl 40, with the actuator lever 32 being pivotable in a first actuator lever direction in response to powered activation of the power driven actuator 30 to cause the pawl 40 to move from the ratchet holding position to the ratchet releasing position, and the actuator lever 32 being pivotable in a second actuator lever direction opposite the first actuator lever direction in response to powered activation of the power driven actuator 30 to cause the pawl 40 to move from the ratchet releasing position to the ratchet holding position. Further, providing a backup actuation lever 82 accessible for mechanical actuation from within a cabin 15 of the motor vehicle 10, with the backup actuation lever 82 being configured for operable communication with the actuator lever 32 to pivot the actuator lever 32 in at least one of the first actuator lever direction, to allow the pawl 40 to be moved from the ratchet holding position to the ratchet releasing position, and the second actuator lever direction, to allow the pawl 40 to be moved from the ratchet releasing position to the ratchet holding position.

In accordance with a further aspect, the method can further include providing a gear member 34 operatively coupled to the power driven actuator 30 for rotation in at least one of a first gear member direction and a second gear member direction opposite the first gear member direction, and providing the gear member 34 having a cam lobe 90 configured for abutment with the actuator lever 32 to pivot the actuator lever 32 in the first actuator lever direction, in response to rotation of the gear member 34 in the first gear member direction, to move the pawl 40 from the ratchet holding position to the ratchet releasing position, and to allow the actuator lever 32 to pivot in the second actuator lever direction, in response to rotation of the gear member 34 in at least one of the first gear member direction and the second gear member direction, to move the pawl 40 from the ratchet releasing position to the ratchet holding position.

Now referring to FIGS. 6 and 9, body 109 includes an annular seal 107, such as a compressible rubber O-ring seal adhere to the body 109 and surrounding the port 111 formed in the housing wall 150 of body 109. When power closure latch assembly 18 is secured to the closure panel (see FIG.

1D), the seal 107 forms a water tight seal between the inner surface of the inner sheet metal layer 216 and the housing 150 to prevent water and debris from entering into the body 109 housing through the port 111.

Figure 8:
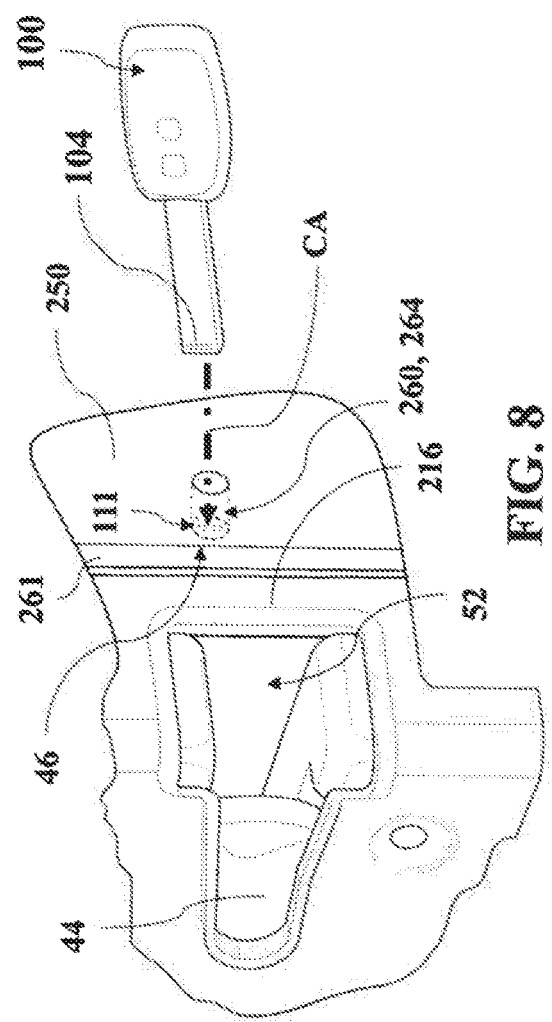
FIG. 8 is an enlarged assembled view of the closure panel of FIG. 1A, illustrating an access feature formed in the trim panel, in accordance with another illustrative embodiment.
Figure 7:
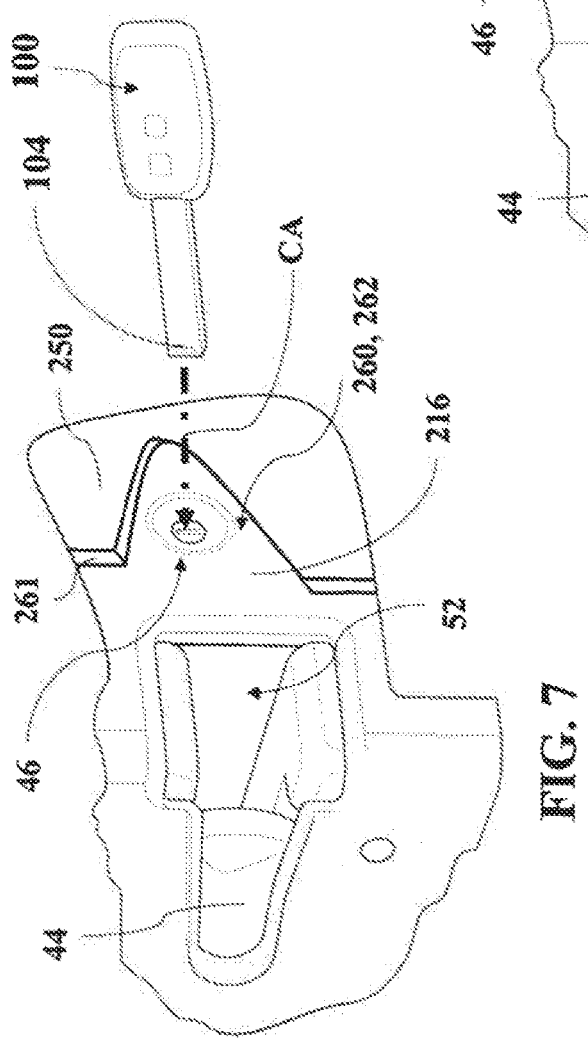
FIG. 7 is an enlarged assembled view of the closure panel of FIG. 1A, illustrating an access feature formed in the trim panel, in accordance with an illustrative embodiment.

Now referring to FIG. 7, to permit access of the key point 104 (e.g. tool) with the receptacle 102, in some vehicle configurations, the trim panel 250 may overlap and block access to the override/reset feature 46. For instance in some vehicle configurations, the trim panel 250 may be configured to be flush with the C-Pillar or a C-pillar trim panel 9. As a result, the trim panel 250 is provided with an access feature, or port 260. For example, in an illustrative example of FIG. 7, the access feature 260 is configured as a notch 262 in the edge 261 of the trim panel 250 aligned to partially surround the override/reset feature 46 when the trim panel 250 is secured to the inner sheet metal layer 216, thereby allowing access to the override/reset feature 46 when the closure panel 16 is in the closed position. Now referring to FIGS. 8 and 12, in accordance with another illustrative embodiment, to permit engagement of the key point 104 with the receptacle 102, the access feature 260 is configured as an aperture 264 extending through the thickness of the trim panel 250, the aperture 264 aligned adjacent to the override/reset feature 46 when the trim panel 250 is secured to the inner sheet metal layer 216, and illustratively having a center co-axial with central axis CA of gear shaft 94, thereby allowing access to the override/reset feature 46 by the insertion of the tip 104 through the aperture 264 and towards the receptacle 102 when the closure panel 16 is in the closed position. A cover or flap (not shown) may be provided to conceal the access feature 260, such as the aperture 264 during normal power release operation of the latch assembly 18 (e.g. non manual release).

Figure 14:
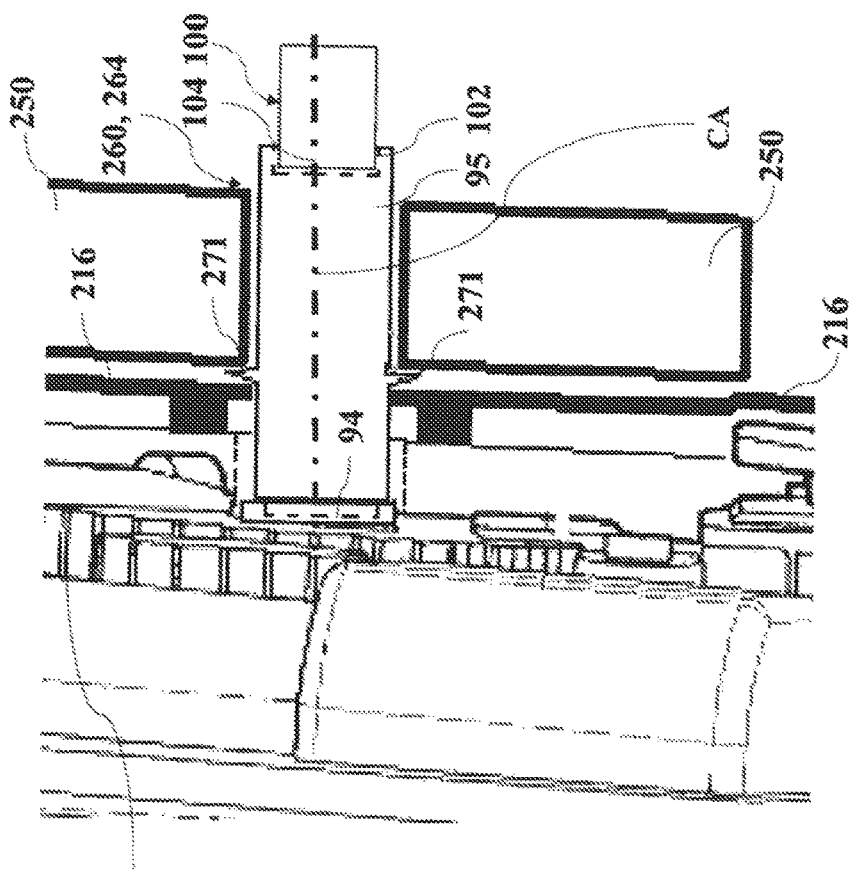
FIG. 14 is an enlarged top view of FIG. 13.
Figure 13:
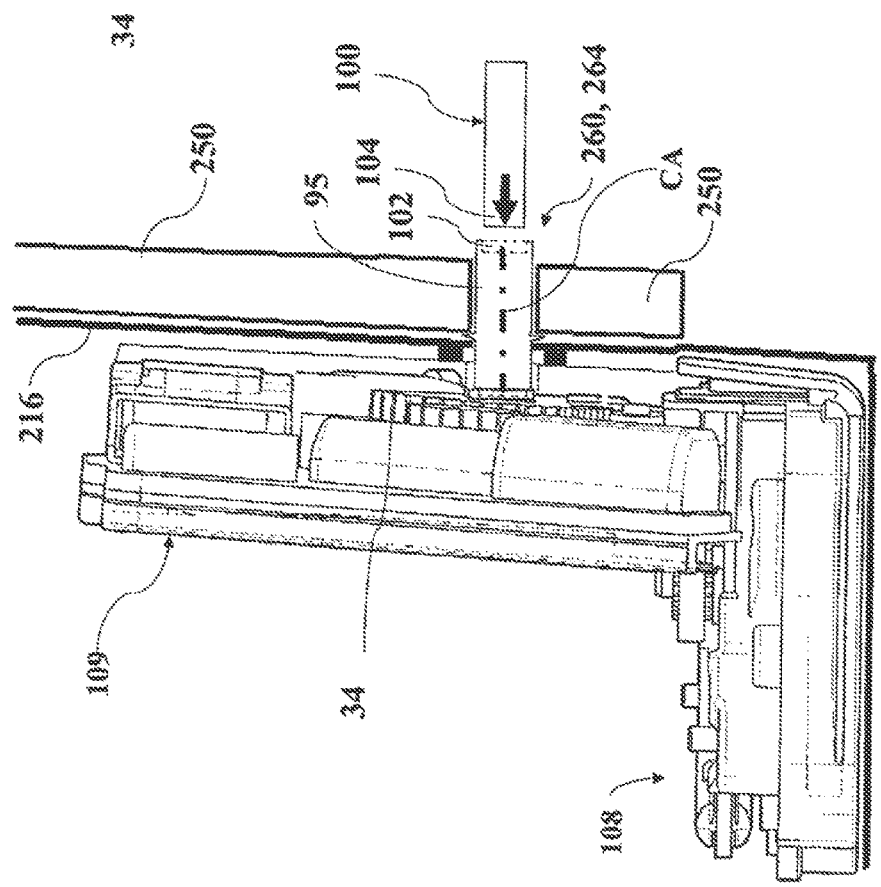
FIG. 13 is top view taken along the line 10'-10' of FIG. 1D, illustrating an access feature of FIG. 8 provided with an extension member.

Now referring to FIGS. 13 and 14, in accordance with another illustrative embodiment, to permit access of the key point 104 with the receptacle 102, the access feature 260 is configured as an aperture 264 in the trim panel 250 having an extension member, such as extension shaft 95 positioned and rotatable within the aperture 264. The extension shaft 95 functions to extend the length of the shaft 94 such that trim panel 250 having a thickness greater that the length of the key 100 does not impede insertion of the key point 104 through the access feature 260. The extension shaft 95 may include retention feature 271, such as snaps, projecting from the circumference of the shaft 95 for engaging an underside portion of the trim panel 250 to retain the shaft 95 within the aperture 264 and allow rotation shaft 95. Extension shaft 95 is illustratively aligned co-axial with central axis CA, thereby allowing access to the override/reset feature 46 by the insertion of the tip 104 in the receptacle 102 now provided on the distal end 91 of the shaft 95 when the closure panel 16 is in the closed position. A cover or flap (not shown) may be provided to conceal the aperture 264 during regular power operated use of the latch assembly 18 (e.g. non-manual release). In another aspect, the receptacle 102 may be sized to receive other objects other than a key 100 in the configuration where the vehicle 10 operates with a keyless FOB i.e. key only has a body 101 and no key shaft or tip 104. For example, receptacle 102 may be configured to receive a coin, such as a quarter, or a flap latch component of a seat belt. Other like tools may be provided. In yet another aspect, and with reference to FIG. 14, access feature 260 may be configured as a manually moveable lever or knob in lieu of the receptacle 102, such as a cantilever projecting from the extension shaft 95 above the trim panel 250 or a knob connected to the shaft 94, 95, that is operable by the user without a tool e.g. a user can manually rotate shaft 94, 95 without the requirement to insert a key tip 104 into the receptacle.

In accordance with a further aspect, the method can further include coupling the backup actuation lever 82 to the gear member 34, such that mechanical actuation of the backup actuation lever 82 from within the cabin 15 of the motor vehicle rotates the gear member 34, in the same fashion as though it were powered by the power driven actuator 30, and causes the actuator lever 32 to pivot in the first actuator lever direction and the second actuator lever direction.

In accordance with a further aspect, the method can further include fixing the backup actuation lever 82 directly to the gear member 34 such that mechanical actuation of the backup actuation lever 82 causes conjoint rotation of the gear member and concurrent pivotal movement of the actuation lever 32.

The foregoing description of the embodiments has been provided for purposes of illustration and description. It is not intended to be exhaustive or to limit the disclosure. Individual elements, assemblies/subassemblies, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A powered closure latch assembly for use with a closure panel in a motor vehicle, comprising:
a ratchet moveable between a striker release position whereat the ratchet is positioned to release a striker and a striker capture position whereat the ratchet is positioned to retain the striker, and wherein the ratchet is biased toward the striker release position;
a pawl moveable between a ratchet holding position whereat the pawl is positioned to hold the ratchet in the striker capture position and a ratchet releasing position whereat the pawl is located to permit movement of the ratchet to the striker release position, wherein the pawl is biased toward the ratchet holding position;
a power driven actuator;
an actuator lever configured in operable communication with the power driven actuator and with the pawl, the actuator lever being moveable in a first actuator lever direction in response to powered activation of the power driven actuator to cause the pawl to move from the ratchet holding position to the ratchet releasing position, and the actuator lever being moveable in a second actuator lever direction opposite the first actuator lever direction to cause the pawl to move from the ratchet releasing position to the ratchet holding position;
a backup actuation lever accessible for mechanical actuation from within a cabin of the motor vehicle, the backup actuation lever being configured in operable communication with the actuator lever to move the actuator lever in at least one of the first actuator lever direction, to allow the pawl to be moved from the ratchet holding position to the ratchet releasing position, and the second actuator lever direction, to allow the pawl to be moved from the ratchet releasing position to the ratchet holding position;

wherein the actuator lever is pivotable, and wherein the backup actuation lever is mechanically actuatable to pivot the actuator lever in the first actuator lever direction and the second actuator lever direction absent power being provided to the power driven actuator;

further including a gear member operatively coupled to the power driven actuator for rotation in at least one of a first gear member direction and a second gear member direction opposite the first gear member direction, the gear member having a cam lobe configured for abutment with the actuator lever to pivot the actuator lever in the first actuator lever direction, in response to rotation of the gear member in at least one of the first gear member direction and the second gear member direction, to move the pawl from the ratchet holding position to the ratchet releasing position, and to allow the actuator lever to pivot in the second actuator lever direction, in response to rotation of the gear member in at least one of the first gear member direction and the second gear member direction, to move the pawl from the ratchet releasing position to the ratchet holding position;

further including a bias imparted on the actuator lever, the bias maintaining the actuator lever in engagement with the cam lobe during pivotal movement of the actuator lever in the first actuator lever direction and the second actuator lever direction; and further including a release lever engaging the actuator lever and biasing the actuator lever into engagement with the cam lobe.

2. The powered closure latch assembly of claim 1, further including a biasing member configured to bias the pawl toward the ratchet holding position.

3. The powered closure latch assembly of claim 1, wherein the actuator lever pivots the release lever against the bias of the release lever to move the pawl from the ratchet holding position to the ratchet releasing position when the actuator lever pivots in the first actuator lever direction in response to rotation of the gear member in at least one of the first gear member direction and the second gear member direction, and the bias of the release lever pivots the actuator lever in the second actuator lever direction in response to rotation of the gear member in at least one of the first gear member direction and the second gear member direction.

4. The powered closure latch assembly of claim 1, wherein the backup actuation lever is coupled to the gear member, such that mechanically actuated movement of the backup actuation lever from within the cabin of the motor vehicle causes the gear member to rotate as though it were powered by the power driven actuator, and the actuator lever to pivot in the first actuator lever direction and the second actuator lever direction.

5. The powered closure latch assembly of claim 4, further including a drive gear coupled to the power driven actuator, the drive gear being in meshed engagement with the gear member to rotate the gear member in at least one of the first gear member direction and the second gear member direction corresponding to the pivotal movement of the actuation lever in the first actuation lever direction and in at least one of the first gear member direction and the second gear member direction corresponding to the pivotal movement of the actuation lever in the second actuation lever direction.

6. A powered closure latch assembly for use with a closure panel in a motor vehicle, comprising:

a ratchet moveable between a striker release position whereat the ratchet is positioned to release a striker and a striker capture position whereat the ratchet is positioned to retain the striker, and wherein the ratchet is biased toward the striker release position;

a pawl moveable between a ratchet holding position whereat the pawl is positioned to hold the ratchet in the striker capture position and a ratchet releasing position whereat the pawl is located to permit movement of the ratchet to the striker release position, wherein the pawl is biased toward the ratchet holding position;

a power driven actuator;

an actuator lever configured in operable communication with the power driven actuator and with the pawl, the actuator lever being moveable in a first actuator lever direction in response to powered activation of the power driven actuator to cause the pawl to move from the ratchet holding position to the ratchet releasing position, and the actuator lever being moveable in a second actuator lever direction opposite the first actuator lever direction to cause the pawl to move from the ratchet releasing position to the ratchet holding position;

a backup actuation lever accessible for mechanical actuation from within a cabin of the motor vehicle, the backup actuation lever being configured in operable communication with the actuator lever to move the actuator lever in at least one of the first actuator lever direction, to allow the pawl to be moved from the ratchet holding position to the ratchet releasing position, and the second actuator lever direction, to allow the pawl to be moved from the ratchet releasing position to the ratchet holding position;

wherein the actuator lever is pivotable, and wherein the backup actuation lever is mechanically actuatable to pivot the actuator lever in the first actuator lever direction and the second actuator lever direction absent power being provided to the power driven actuator;

further including a gear member operatively coupled to the power driven actuator for rotation in at least one of a first gear member direction and a second gear member direction opposite the first gear member direction, the gear member having a cam lobe configured for abutment with the actuator lever to pivot the actuator lever in the first actuator lever direction, in response to rotation of the gear member in at least one of the first gear member direction and the second gear member direction, to move the pawl from the ratchet holding position to the ratchet releasing position, and to allow the actuator lever to pivot in the second actuator lever direction, in response to rotation of the gear member in at least one of the first gear member direction and the second gear member direction, to move the pawl from the ratchet releasing position to the ratchet holding position;

wherein the backup actuation lever is coupled to the gear member, such that mechanically actuated movement of the backup actuation lever from within the cabin of the motor vehicle causes the gear member to rotate as though it were powered by the power driven actuator, and the actuator lever to pivot in the first actuator lever direction and the second actuator lever direction;

further including a drive gear coupled to the power driven actuator, the drive gear being in meshed engagement with the gear member to rotate the gear member in at least one of the first gear member direction and the second gear member direction corresponding to the pivotal movement of the actuation lever in the first actuation lever direction and in at least one of the first gear member direction and the second gear member direction corresponding to the pivotal movement of the actuation lever in the second actuation lever direction; and wherein the backup actuation lever is fixed directly to the gear member such that mechanically actuated movement of the backup actuation lever causes conjoint rotation of the gear member, concurrent rotation of the drive gear and concurrent pivotal movement of the actuation lever, wherein the backup actuation lever extends coaxially along a rotational axis of the gear member.

7. A closure panel for a motor vehicle, comprising:

an outer panel and an inner panel with an edge face extending therebetween;

a power closure latch assembly mounted along the edge face, the power closure latch assembly including a ratchet moveable between a striker release position whereat the ratchet is positioned to release a striker to allow the closure panel to be opened and a striker capture position whereat the ratchet is positioned to retain the striker to maintain the closure panel in a closed position, wherein the ratchet is biased toward the striker release position, and a pawl moveable between a ratchet holding position whereat the pawl holds the ratchet in the striker capture position and a ratchet releasing position whereat the pawl permits movement of the ratchet to the striker release position, with the pawl being biased toward the ratchet holding position;

an actuator lever configured in operable communication with a power driven actuator and with the pawl, the actuator lever being pivotable in a first actuator lever direction in response to powered activation of the power driven actuator to cause the pawl to move from the ratchet holding position to the ratchet releasing position, and the actuator lever being pivotable in a second actuator lever direction opposite the first actuator lever direction in response to powered activation of the power driven actuator to cause the pawl to move from the ratchet releasing position to the ratchet holding position;

a backup actuation lever accessible for mechanical actuation from within a cabin of the motor vehicle, the backup actuation lever being configured in operable communication with the actuator lever to pivot the actuator lever in at least one of the first actuator lever direction, to allow the pawl to be moved from the ratchet holding position to the ratchet releasing position, and the second actuator lever direction, to allow the pawl to be moved from the ratchet releasing position to the ratchet holding position;

wherein the backup actuation lever is mechanically actuatable to pivot the actuator lever in the first actuator lever direction and the second actuator lever direction absent power being provided to the power driven actuator;

further including a gear member operatively coupled to the power driven actuator for rotation in at least one of a first gear member direction and a second gear member direction opposite the first gear member direction, the gear member having a cam lobe configured for abutment with the actuator lever to pivot the actuator lever in the first actuator lever direction, in response to rotation of the gear member in at least one of the first gear member direction and the second gear member direction, to move the pawl from the ratchet holding position to the ratchet releasing position, and to allow the actuator lever to pivot in the second actuator lever direction, in response to rotation of the gear member in at least one of the first gear member direction and the second gear member direction, to move the pawl from the ratchet releasing position to the ratchet holding position; and wherein the actuator lever pivots in the first actuator lever direction, in response to rotation of the gear member in the first gear member direction, to move the pawl from the ratchet holding position to the ratchet releasing position, and the actuator lever pivots in the second actuator lever direction, in response to rotation of the gear member in the first gear member direction, to move the pawl from the ratchet releasing position to the ratchet holding position.

8. The closure panel of claim 7, wherein the actuator lever pivots in the first actuator lever direction, in response to rotation of the gear member in the first gear member direction, to move the pawl from the ratchet holding position to the ratchet releasing position, and the actuator lever pivots in the second actuator lever direction, in response to rotation of the gear member in the second gear member direction, to move the pawl from the ratchet releasing position to the ratchet holding position.

9. The closure panel of claim 7, wherein the backup actuation lever is coupled to the gear member, such that mechanically actuated movement of the backup actuation lever from within the cabin of the motor vehicle causes the gear member to rotate as though it were powered by the power driven actuator, and the actuator lever to pivot in the first actuator lever direction and the second actuator lever direction.

10. The closure panel of claim 7, wherein the backup actuation lever is fixed directly to the gear member such that mechanically actuated movement of the backup actuation lever causes conjoint rotation of the gear member and concurrent pivotal movement of the actuation lever.

11. A closure panel for a motor vehicle, comprising:

an outer panel and an inner panel with an edge face extending therebetween;

a power closure latch assembly mounted along the edge face, the power closure latch assembly including a ratchet moveable between a striker release position whereat the ratchet is positioned to release a striker to allow the closure panel to be opened and a striker capture position whereat the ratchet is positioned to retain the striker to maintain the closure panel in a closed position, wherein the ratchet is biased toward the striker release position, and a pawl moveable between a ratchet holding position whereat the pawl holds the ratchet in the striker capture position and a ratchet releasing position whereat the pawl permits movement of the ratchet to the striker release position, with the pawl being biased toward the ratchet holding position;

an actuator lever configured in operable communication with a power driven actuator and with the pawl, the actuator lever being pivotable in a first actuator lever direction in response to powered activation of the power driven actuator to cause the pawl to move from the ratchet holding position to the ratchet releasing position, and the actuator lever being pivotable in a second actuator lever direction opposite the first actuator lever direction in response to powered activation of the power driven actuator to cause the pawl to move from the ratchet releasing position to the ratchet holding position;

a backup actuation lever accessible for mechanical actuation from within a cabin of the motor vehicle, the backup actuation lever being configured in operable communication with the actuator lever to pivot the actuator lever in at least one of the first actuator lever direction, to allow the pawl to be moved from the ratchet holding position to the ratchet releasing position, and the second actuator lever direction, to allow the pawl to be moved from the ratchet releasing position to the ratchet holding position;

wherein the backup actuation lever is mechanically actuatable to pivot the actuator lever in the first actuator lever direction and the second actuator lever direction absent power being provided to the power driven actuator;

further including a gear member operatively coupled to the power driven actuator for rotation in at least one of a first gear member direction and a second gear member direction opposite the first gear member direction, the gear member having a cam lobe configured for abutment with the actuator lever to pivot the actuator lever in the first actuator lever direction, in response to rotation of the gear member in at least one of the first gear member direction and the second gear member direction, to move the pawl from the ratchet holding position to the ratchet releasing position, and to allow the actuator lever to pivot in the second actuator lever direction, in response to rotation of the gear member in at least one of the first gear member direction and the second gear member direction, to move the pawl from the ratchet releasing position to the ratchet holding position;

wherein the backup actuation lever is fixed directly to the gear member such that mechanically actuated movement of the backup actuation lever causes conjoint rotation of the gear member and concurrent pivotal movement of the actuation lever; and wherein the backup actuation lever extends coaxially along a rotational axis of the gear member.

12. The closure panel of claim 11, further comprising an inner trim panel mounted to the inner panel, the trim panel comprising an aperture aligned with the rotational axis for allowing a tool to engage the backup actuation lever.

* * * * *